US012629639B2

(12) United States Patent　　(10) Patent No.: US 12,629,639 B2
Liu et al.　　(45) Date of Patent: May 19, 2026

(54) SPACER FOR A SPIRAL WOUND MEMBRANE

(71) Applicant: EVOVE LTD, Manchester (GB)

(72) Inventors: Kangsheng Liu, Manchester (GB); Tom Pugh, Manchester (GB); Tristan Philips, Manchester (GB)

(73) Assignee: EVOVE LTD, Manchester (GB)

( * ) Notice: Subject to any disclaimer, the term of this patent is extended or adjusted under 35 U.S.C. 154(b) by 265 days.

(21) Appl. No.: 18/280,878

(22) PCT Filed: Mar. 9, 2022

(86) PCT No.: PCT/GB2022/050611
§ 371 (c)(1),
(2) Date: Sep. 7, 2023

(87) PCT Pub. No.: WO2022/189785
PCT Pub. Date: Sep. 15, 2022

(65) Prior Publication Data
US 2024/0157304 A1　May 16, 2024

(30) Foreign Application Priority Data
Mar. 9, 2021　(GB) ..................................... 2103267

(51) Int. Cl.
| | |
|---|---|
| *B01D 63/10* | (2006.01) |
| *B01D 61/02* | (2006.01) |
| *B01D 69/02* | (2006.01) |
| *B01D 69/12* | (2006.01) |
| *B01D 71/56* | (2006.01) |
| *B33Y 10/00* | (2015.01) |
(Continued)

(52) U.S. Cl.
CPC ......... *B01D 63/103* (2013.01); *B01D 61/025* (2013.01); *B01D 69/02* (2013.01); *B01D 69/1251* (2022.08); *B01D 71/56* (2013.01); *B33Y 10/00* (2014.12); *B33Y 80/00* (2014.12); *C02F 1/441* (2013.01); *B01D 2313/143* (2013.01); *B01D 2313/146* (2013.01); *B01D 2325/04* (2013.01); *C02F 2103/08* (2013.01)

(58) Field of Classification Search
CPC .............. B01D 63/103; B01D 2313/14; B01D 2313/146; B33Y 80/00
See application file for complete search history.

(56) References Cited

U.S. PATENT DOCUMENTS

2020/0376439 A1　12/2020　Roderick et al.

FOREIGN PATENT DOCUMENTS

| | | |
|---|---|---|
| JP | 2004 089763 A | 3/2004 |
| JP | 2020516444 A | 6/2020 |

(Continued)

OTHER PUBLICATIONS

International Search Report (ISR) for PCT/GB2022/050611 mailed Jul. 26, 2022 ( 7 pages).

(Continued)

*Primary Examiner* — Bradley R Spies
(74) *Attorney, Agent, or Firm* — Jason A. Smith; Shumaker, Loop & Kendrick, LLP

(57) ABSTRACT

A component for a spiral wound membrane, suitably for water filtration. The component includes an integrally formed non-uniform lattice structure. The lattice structure includes a first and second repeating unit cell, wherein the first and second unit cell are different.

16 Claims, 2 Drawing Sheets

400

402

404

120 um

(51) Int. Cl.
    *B33Y 80/00*         (2015.01)
    *C02F 1/44*         (2023.01)
    *C02F 103/08*      (2006.01)

(56)            References Cited

FOREIGN PATENT DOCUMENTS

| WO | 2019/106344 A1 | 6/2019 |
| WO | 2019/122828 A1 | 6/2019 |
| WO | 2019/186134 A1 | 10/2019 |
| WO | 2019/220886 A1 | 11/2019 |
| WO | 2020/169883 A1 | 8/2020 |

OTHER PUBLICATIONS

Written Opinion (WO) for PCT/GB2022/050611 mailed Jul. 26, 2022 ( 12 pages).

100

102

104

106

200

204a

202

204b 275 um

SPACER FOR A SPIRAL WOUND MEMBRANE

FIELD

The present invention relates to a component for a spiral wound membrane. More specifically, the present invention relates to a permeate/feed carrier or backing layer for spiral wound membranes, suitably for water treatment.

BACKGROUND

Conventional methods of water treatment such as chemical disinfection, solar disinfection, boiling, sedimentation and distillation are not sufficient to meet the portable water requirement of the world's population at low cost. In order to tackle the problem, more advanced technologies have been established and industrialised, such as pressure driven membrane-based water treatment technologies which in general include ultrafiltration (UF), microfiltration (MF), nanofiltration (NF), and reverse osmosis (RO). By providing the advantages of circumventing the application of thermal inputs, chemical additives and reducing medium regeneration, these methods have significantly improved the water treatment industry.

Membrane filtration is favoured over other water treatment technologies due to, in principle, no significant thermal input, fewer chemical additives and a lower requirement for the regeneration of spent media. Pressure-driven membrane processes are the most widely applied membrane technologies in water treatment, for the removal of particulates, ions, microorganisms, bacteria and natural organic materials, covering different applications from waste treatment from the food and oil industry to seawater desalination.

However, current manufacturing methods are uncontrolled and result in membranes with large pore size distributions and limited formats. The membranes produced by these uncontrolled methods have a high-pressure requirement and provide a low permeate yield. Such membranes are highly susceptible to fouling resulting in a limited lifetime.

Therefore, it is desirable to provide functional membranes with further improved properties such as low energy cost, and higher water flux rate for sustainable water treatment and modern water treatment industry.

Spiral wound membranes are a common type of membrane filtration technology that comprise a plurality of membrane envelopes and feed carriers wrapped around a central permeate collection tube. The membrane envelope typically comprises a filtration membrane layer (typically comprising an active layer, support layer and backing layer) and a permeate carrier. The membrane envelope is sealed together along three outer edges, and is attached to the central permeate collection tube along a fourth edge.

Typically, the feed is supplied to the filtration membrane layer by the feed carrier to separate a mixture of components, generally with the application of a driving force applied across the surface of the membrane, such as transmembrane pressure (TMP), to obtain the filtered permeate in the permeate carrier. The permeate is then collected in the central permeate collection tube.

Carriers are an important component used in spiral wound membrane filtration and often perform a dual role. Feed carriers typically provide structural support between the membrane envelopes and enhance feed mixing. Permeate carriers typically provide structural support within the membrane envelope and enhance permeate flow to the central permeate collection tube.

Currently, the commercially available carriers, such as permeate carriers and feed carriers, perform well in many applications; however, the drive to produce new water resources and protect existing water resources demands more advanced carriers having improved turbulence, packing density, transmembrane pressure, a longer life span at low cost and/or more controllable manufacturing defects. New materials and new processing technologies having properties to fulfil the demands are desired.

In general, a robust water filtration module for water treatment should display properties including high chemical, mechanical and thermal stability, good fouling resistance with cleanability, long life span, high permeability and controllable selectivity. Carriers for use in these water filtration modules should have commercial accessibility, such as low material and manufacturing costs, high manufacturing scalability, and reasonable lead times to commercialisation.

Therefore, there is a requirement for improved carriers for efficient water treatment. It is therefore an object of aspects of the present invention to address one or a few of the problems mentioned above or other problems.

SUMMARY

According to a first aspect of the present invention, there is provided a component for a spiral wound membrane, such as for water filtration, comprising an integrally formed non-uniform lattice structure, wherein the lattice structure comprises a first and second repeating unit cell, wherein the first and second unit cells are different.

According to a second aspect of the present invention, there is provided a backing layer for a spiral wound membrane, suitably for water filtration, comprising an integrally formed lattice structure.

According to a third aspect of the present invention, there is provided a component for a spiral wound membrane, suitably a component according to the first or second aspect of the present invention, wherein the component is prepared by a method comprising the step of:
a. producing the component by additive manufacturing a lattice structure, optionally comprising a first and second lattice unit cell, to produce an integrally formed non-uniform lattice structure.

According to a fourth aspect of the present invention, there is provided a method of preparing a component for a spiral wound membrane, suitably a component according to the first or second aspect of the present invention, the method comprising the step of:
a. producing the component by additive manufacturing a lattice structure, optionally comprising a first and second lattice unit cell, to produce an integrally formed non-uniform lattice structure.

According to a fifth aspect of the present invention, there is provided a membrane envelope comprising a component according to any of the first to fourth aspects of the present invention.

According to a sixth aspect of the present invention there is provided a spiral wound membrane comprising a membrane envelope according to the fifth aspect of the present invention.

According to a seventh aspect of the present invention, there is provided a water treatment module comprising a spiral wound membrane according to the sixth aspect of the present invention.

According to an eight aspect of the present invention there is provided a water treatment device comprising a water treatment module according to the seventh aspect of the present invention.

The component for a spiral wound membrane according to any aspect of the present invention may be a permeate carrier and/or a backing layer, operable to allow for permeate flow, or a feed flow carrier, operable to allow for feed flow.

The membrane envelope may comprise a filtration membrane layer, suitably a first and a second filtration membrane layer. The filtration membrane layer may comprise an active layer with a support layer and optionally a backing layer. The component for a spiral wound membrane according to any aspect of the present invention, when operable to allow permeate to flow, may be arranged between the first and second filtration membrane layers such as to be in fluid communication with the filtration membrane layers.

The membrane envelope may be sealed, such as to form a fluid seal, suitably glued, along 3 sides. The membrane envelope may be sealed along a centre line extending longitudinally from the central permeate collection tube. The fourth side of the membrane envelope may be operable to, or be, attached to a central permeate collection tube.

The membrane envelope may have a thickness of ≤950 μm, such as ≤750 μm, such as ≤500 μm, such as ≤300 μm, such as ≤200 μm.

The component for a spiral wound membrane, when operable to allow permeate to flow, may comprise ≥40% of the total membrane envelope thickness, such as ≥42%, such as ≥44%, such as ≥46%, such as ≥48%.

The component for a spiral wound membrane, when operable to allow permeate to flow, may comprise ≤60% of the total membrane envelope thickness, such as ≤58%, such as ≤56%, such as ≤54%, such as ≤52%.

The component for a spiral wound membrane, when operable to allow permeate to flow, may comprise 40% to 60% of the total membrane envelope thickness, such as 42% to 58%, such as 44% to 56%, such as 46% to 54%, such as 48% to 52%.

The component for a spiral wound membrane, suitably a permeate flow carrier, may have any suitable thickness. The thickness of the component for a spiral wound membrane, suitably a permeate flow carrier, may be ≤450 μm, such as ≤350 μm, such as ≤250 μm, such as ≤200 μm, such as ≤100 μm.

The membrane envelope may comprise a first and second filtration membrane layer, each layer comprising a support layer with an active layer arranged over at least a portion of the support layer; the membrane envelope further comprising a component according to the present invention operable to allow permeate to flow, wherein a first side of the component is adjacent to, or suitably abuts, the backing layer of the first filtration membrane layer and a second side of the component, suitably opposed to the first side, is adjacent to, or suitably abuts, the backing layer of the second filtration membrane layer.

The component for a spiral wound membrane, suitably a feed flow carrier, may have any suitable thickness. The thickness of component for a spiral wound membrane, suitably a feed flow carrier, may be ≤850 μm, such as ≤700 μm, such as ≤650 μm, such as ≤600 μm, such as ≤550 μm, such as ≤500 μm, such as ≤350 μm, such as ≤250 μm.

Accordingly, the spiral wound membrane may comprise a first and second membrane envelope, wherein a first side of a component according to the present invention that is operable to allow feed flow, is adjacent to, suitably abuts, the first membrane envelope and a second side of the component, suitably opposed to the first side, is adjacent to, suitably abuts, the second membrane envelope.

The component for a spiral wound membrane may comprise a Z plane that extends substantially vertically along the lattice structure, typically along the thickness of the lattice structure. The component for a spiral wound membrane may comprise a X plane that extends substantially horizontally along the lattice structure from the feed inlet to retentate outlet, suitably substantially perpendicular to retentate tube. The component for a spiral wound membrane may comprise a Y plane that extends substantially horizontally along the lattice structure from the permeate tube to the opposing edge of the lattice structure.

The thickness of the component for a spiral wound membrane may change along the X, Y and/or Z planes. Preferably the thickness of the component for a spiral wound membrane changes along the X plane. Preferably the thickness of the component for a spiral wound membrane decreases along the X plane along the direction of feed flow.

When the thickness of the component for a spiral wound membrane decreases across the X plane the lattice structure may be operable to facilitate selective sieving to the active layer. Advantageously, when the size of the unit cells decreases across the X plane, the active layer may selectively filter large particles close to and around the inlet and small particles close to, and around, the outlet. The reduction in the size of the unit cells along the X plane reduces fouling of the active layer by larger particles close to, and around, the outlet. This leads to increased longevity of the spiral membrane.

The second repeating cell unit may have a different shape compared to the first repeating unit cell.

The shape of the unit cell may be independently selected from diamond, cubic, fluorite, octet, kelvin cell, iso truss, hex prism diamond, truncated cube, truncated octahedron, weaire-phelan, body centered cubic, face centered cubic and/or triply periodic minimal surface (TPMS).

The unit cell may be independently selected from a TPMS structure such as Gyroid, Schwarz Primitive, Schwarz Diamond, Schwarz Cross Layers of Parallels, Schwarz Hexagonal, Split P, Neovius, and/or Double Gyroid.

The scalar field of two or more unit cells may be mixed to generate a new mixed field unit cell. The second repeating unit cell may have a different size compared to the first repeating unit cell.

The unit cells may comprise a pore, wherein upon arrangement of the unit cells within the lattice structure, the pores are interconnected to allow permeate or feed to flow through the interconnected pores. Suitably, upon arrangement of the first and second repeating unit cells within the non-uniform lattice structure, the pores are interconnected to allow permeate or feed to flow through the interconnected pores.

The pore size of the unit cell may be independently selected from any suitable pore size sufficient to permit the passage of permeate or feed.

The second repeating unit cell may have a different pore size compared to the first repeating unit cell. The pore size of the unit cells may change across the X, Y and/or Z planes.

The pore size of the unit cells of the lattice structure, when operable to allow permeate to flow, may be ≥5 mm, such as ≥4 mm, such as ≥3 mm.

The pore size of the unit cells of the lattice structure, when operable to allow permeate to flow, may be ≥10 μm, such as ≥20 μm, such as ≥30 μm.

The pore size of the unit cells of the lattice structure, when operable to allow permeate to flow, may be 5 mm to 10 μm, such as 4 mm to 20 μm, such as 3 mm to 30 μm.

The pore size of the unit cells of the lattice structure, when operable to allow feed to flow, may be ≤5 mm, such as ≤4 mm, such as ≤3 mm, such as ≤1 mm, such as ≤0.5 mm.

The pore size of the unit cells of the lattice structure, when operable to allow feed to flow, may be ≥10 μm, such as ≥20 μm, such as ≥30 μm, such as ≥40 μm, such as ≥50 μm.

The pore size of the unit cells of the lattice structure, when operable to allow feed to flow, may be 5 mm to 10 μm, such as 4 mm to 20 μm, such as 3 mm to 30 μm, such as 1 mm to 40 μm, such as 0.5 mm to 50 μm.

The strut thickness of the unit cell may be independently selected from any suitable thickness.

The second repeating unit cell may have a different strut thickness compared to the first repeating unit cell. The thickness of the unit cell struts may change across the X, Y and/or Z planes. Preferably, the thickness of the unit cell struts may change across the X plane.

The strut thickness of the unit cells of the lattice structure, when operable to allow permeate to flow, may be ≤5 mm, such as ≤4 mm, such as ≤3 mm.

The strut thickness of the unit cells of the lattice structure, when operable to allow permeate to flow, may be ≥10 μm, such as ≥20 μm, such as ≥30 μm.

The strut thickness of the unit cells of the lattice structure, when operable to allow permeate to flow, may be 5 mm to 10 μm, such as 4 mm to 20 μm, such as 3 mm to 30 μm.

The strut thickness of the first and second repeating unit cell, when operable to allow feed to flow, may be ≤5 mm, such as ≤4 mm, such as ≤3 mm, such as ≤1 mm, such as ≤0.5 mm.

The strut thickness of the first and second repeating unit cell, when operable to allow feed to flow, may be ≥10 μm, such as ≥20 μm, such as ≥30 μm, such as ≥40 μm, such as ≥50 μm.

The strut thickness of the first and second repeating unit cell, when operable to allow feed to flow, may be 5 mm to 10 μm, such as 4 mm to 20 μm, such as 3 mm to 30 μm, such as 1 mm to 40 μm, such as 0.5 mm to 50 μm.

The unit cell struts may be shelled to form an internally hollow structure. Advantageously, the hollow structure reduces the amount of material used in the manufacturing process along with reduced weight of the carrier and cost to manufacture.

The first and second repeating unit cell may alternate along at least a portion of the X, Y and/or Z plane throughout the lattice structure. Preferably, the thickness of the unit cell struts may change across the X plane.

The first repeating unit cell may be arranged in a first layer and the second repeating unit cell may be arranged in a second layer, wherein in each respective layer the unit cell may comprise >50% of the first or second unit cell, such as ≥70% or ≥85%. Said layers may be arranged, such as stacked, along the Z plane. The first layer may have a larger average unit cell pore size than the second layer. Advantageously, this arrangement allows a uniform coating of the support layer and hence the active layer. Furthermore, when the first and second repeating unit cell are arranged in this way the permeate may flow more freely within the membrane envelope.

The second repeating unit cell may be dispersed or clustered throughout a lattice structure of the first repeating unit cell. The dispersion of the repeating unit cell may be random or at regular intervals throughout the lattice structure.

The first unit cell may be located at the outer edges of the lattice structure and the second unit cell may be located at the centre of the lattice structure. Alternatively, the arrangement of the first unit cell in relation to the second unit cell may be random.

The non-uniform lattice of the present invention may be operable to provide a Reynolds number (Re) of at least 2300 in a spiral wound membrane at a slower flow rate than a comparative component in the same spiral wound membrane under the same conditions, wherein the comparative component is the same as the component of the present invention except that the comparative component has a uniform lattice structure formed of either the first unit cell or the second unit cell, such as at a slower flow rate of from 0 to 1 m/s. The non-uniform lattice design also advantageously maintains the Re number of at least 2300 for a longer period of time allowing for reduced back wash by at least 100% when compared to the comparative component References herein to "comparative component", unless provided otherwise, refer to a comparative component in the same spiral wound membrane under the same conditions as the component of the present invention, wherein the comparative component is the same as the component of the present invention except that the comparative component has a uniform lattice structure formed of either the first unit cell or the second unit cell.

The component for a spiral wound membrane according to any aspect of the present invention may be operable to provide a transmembrane pressure of ≤15 bar, such as ≤12 bar, such as ≤9 bar, such as when operable to filter brackish water.

The component for a spiral wound membrane according to any aspect of the present invention may be operable to provide a transmembrane pressure of ≥3 bar, such as ≤5 bar, such as ≤6 bar, such as when operable to filter brackish water.

The component for a spiral wound membrane according to any aspect of the present invention may be operable to provide a transmembrane pressure of 3 bar to 15 bar, such as 5 bar to 12 bar, such as 6 bar to 9 bar, such as when operable to filter brackish water.

The component for a spiral wound membrane according to any aspect of the present invention may be operable to provide a transmembrane pressure of ≤50 bar, such as ≤48 bar, such as ≤46 bar, such as ≤44 bar, such as ≤42 bar, such as when operable to filter seawater.

The component for a spiral wound membrane according to any aspect of the present invention may be operable to provide a transmembrane pressure of ≥30 bar, such as ≤32 bar, such as ≤34 bar, such as ≤36 bar, such as ≤38 bar, such as when operable to filter seawater.

The component for a spiral wound membrane according to any aspect of the present invention may be operable to provide a transmembrane pressure of 30 bar to 50 bar, such as 32 bar to 48 bar, such as 34 bar to 46 bar, 36 bar to 44 bar, 38 bar to 42 bar, such as when operable to filter seawater.

The component for a spiral wound membrane according to any aspect of the present invention may be operable to provide a transmembrane pressure in a spiral wound membrane that is 25% lower compared to a comparative component, such as ≥20%, or ≥40%.

The component for a spiral wound membrane according to any aspect of the present invention may be operable to provide a permeate flux of ≤140 L/(m² hr), such as ≤120 L/(m² hr), such as ≤105 L/(m² hr).

The component for a spiral wound membrane according to any aspect of the present invention may be operable to provide a permeate flux of ≥75 L/(m² hr), such as ≥85 L/(m² hr), such as ≥100 L/(m² hr).

The component for a spiral wound membrane according to any aspect of the present invention may be operable to provide a permeate flux of 75 L/(m² hr) to 140 L/(m² hr), such as 85 L/(m² hr) to 120 L/(m² hr), such as 100 L/(m² hr) to 105 L/(m² hr).

The component for a spiral wound membrane according to any aspect of the present invention may be operable to provide a permeate flux in a spiral wound membrane that is 25% higher than a comparative component such as ≥20%, or ≥40%.

The component for a spiral wound membrane according to any aspect of the present invention may have packing density of ≤1800 m²/m³, such as ≤1500 m²/m³, such as 1300 m²/m³.

The component for a spiral wound membrane according to any aspect of the present invention may have packing density of ≥650 m²/m³, such as ≥750 m²/m³, such as ≥900 m²/m³.

The component for a spiral wound membrane according to any aspect of the present invention may have packing density of 650 m²/m³ to 1800 m²/m³, such as 750 m²/m³ to 1500 m²/m³, such as 900 m²/m³ to 1300 m²/m³.

The component for a spiral wound membrane according to any aspect of the present invention may have a packing density that is ≥10% higher compared to a comparative component, such as ≥25% or ≥50%.

Packing density may be calculated by any suitable method known to the skilled person. In general terms:

$$\text{Packing density} = \frac{\text{membrane surface area}}{\text{unit volume}}$$

For example, when the membrane comprises cylindrical feed flow channels that packing density may be calculated as follows;

Dimensional measurements are made of:

$r_c$=Single channel radius
L=Channel length
$r_f$=Ceramic filter radius
$L_f$=Ceramic filer length $$C = 2 \times \pi \times r_c$$

$$V = L_f \times \pi \times r_f^2$$

C=Channel Circumference
$L_c$=Channel length
N=number of channels
V=ceramic filter volume $$\text{Packing density} = \frac{N \times C \times L_c}{V}$$

The component for a spiral wound membrane according to any aspect of the present invention may be operable to provide a ≥5% reduction of pressure in a spiral wound membrane compared to a comparative component, more preferably ≥10%, most preferably ≥15%.

The component for a spiral wound membrane, suitably a feed flow carrier, may be operable to reduce the cleaning-in-place (CIP) frequency in a spiral wound membrane by 250% compared to a comparative component.

The component for a spiral wound membrane according to any aspect of the present invention may have an active surface area of ≤1800 m²/m³, such as ≤1600 m²/m³, such as ≤1300 m²/m³.

The component for a spiral wound membrane according to any aspect of the present invention may have an active surface area of ≥850 m²/m³, such has ≥1000 m²/m³, such as ≥1200 m²/m³.

The component for a spiral wound membrane according to any aspect of the present invention may have an active surface area of 850 m²/m³ to 1800 m²/m³, such as 1000 m²/m³ to 1600 m²/m³, such as 1200 m²/m³ to 1300 m²/m³.

The component for a spiral wound membrane according to any aspect of the present invention may have an active surface area that is ≥10% higher than comparative component, more preferably ≥30%, such as ≥50%.

Typically, in a spiral wound membrane, the backing layer is a permeable material that provides structural support to the active layer and support layer.

The backing layer according to the second aspect of the present invention may have any suitable thickness. The thickness of the backing layer according to the second aspect of the present invention may be ≤120 μm, such as ≤100 μm, such as ≤80 μm, such as ≤50 μm, such as ≤30 μm.

The backing layer according to the second aspect of the present invention may comprise ≤40% of the membrane envelope thickness, such as ≤38%, such as ≤36%, such as ≤34%, such as ≤32%.

The backing layer according to the second aspect of the present invention may comprise ≥20% of the membrane envelope thickness, such as ≥22%, such as ≥24%, such as ≥26%, such as ≥28%.

The backing layer according to the second aspect of the present invention may comprise 20% to 40% of the membrane envelope thickness, such as 22% to 38%, such as 24% to 36%, such as 26% to 34% such as 28% to 32%.

Accordingly, the membrane envelope may comprise a first and second filtration membrane layer, each layer comprising a support layer with an active layer arranged over at least a portion of the support layer; the membrane envelope further comprising a backing layer, operable to allow permeate to flow, wherein a first side of the backing layer abuts the support layer of the first filtration membrane layer and a second side of the baking layer, suitably opposed to the first side, abuts the support layer of the second filtration membrane layer.

However, advantageously, when the component for a spiral wound membrane, operable as a combined permeate carrier and backing layer, is present in the membrane envelope, the thickness of the membrane envelope may be reduced.

Advantageously, the component for a spiral wound membrane, when operable to allow permeate to flow as a combined permeate carrier and backing layer, may provide sufficient mechanical support to the active and support layer.

Accordingly, the membrane envelope may comprise a first and second filtration membrane layer, each layer comprising a support layer with an active layer arranged over at least a portion of the support layer; the membrane envelope further comprising a component for a spiral wound membrane, operable to allow permeate to flow as a combined permeate carrier and backing layer, wherein a first side of the component for a spiral wound membrane abuts the support layer of the first filtration membrane layer and a second side of the component for a spiral wound membrane, suitably opposed to the first side, abuts the support layer of the second filtration membrane layer.

The membrane envelope, when comprising a component for a spiral wound membrane operable to allow permeate to flow as a combined permeate carrier and backing layer, may have a thickness of ≤400 µm, such as ≤300 µm, such as ≤200 µm.

The component for a spiral wound membrane, when operable to allow permeate to flow as a combined permeate carrier and backing layer, may have any suitable thickness. The thickness of the component for a spiral wound membrane, when operable to allow permeate to flow as a combined permeate carrier and backing layer, may be ≤120 µm, such as ≤100 µm, such as ≤60 µm, such as ≤30 µm.

The component for a spiral wound membrane, when operable to allow permeate to flow as a combined permeate carrier and backing layer, may comprise ≥30% of the membrane envelope thickness, such as ≥35%, such as ≥40%, such as ≥45%, such as ≥50%.

The component for a spiral wound membrane, when operable to allow permeate to flow as a combined permeate carrier and backing layer, may comprise ≤75% of the membrane envelope thickness, such as ≤70%, such as ≤65%, such as ≤60%, such as ≤55%.

The component for a spiral wound membrane, when operable to allow permeate to flow as a combined permeate carrier and backing layer, may comprise 30% to 75% of the membrane envelope thickness, such as 35% to 70%, such as 40% to 65%, such as 45% to 60%, such as 50% to 55%.

The pore size of the unit cells of the lattice structure, when operable to allow permeate to flow as a combined permeate carrier and backing layer, may be ≤500 µm, such as ≤400 µm, such as ≤300 µm.

The pore size of the unit cells of the lattice structure, when operable to allow permeate to flow as a combined permeate carrier and backing layer, may be ≥1 µm, such as ≥2 µm, such as ≥3 µm.

The pore size of the unit cells of the lattice structure, when operable to allow permeate to flow as a combined permeate carrier and backing layer, may be 1 µm to 500 µm, such as 2 µm to 400 µm, such as 3 µm to 300 µm.

The lattice structure of the component for a spiral wound membrane operable to allow permeate to flow as a combined permeate carrier and backing layer, may have a higher archival lattice structure.

The component for a spiral wound membrane, when operable to allow permeate to flow as a combined permeate carrier and backing layer, may provide ≥10% increase in packing density and/or ≥10% increment in active surface area compared to a comparative component, which is the same as the component of the present invention except that the comparative component comprises a uniform lattice structure formed from the first or second unit cell and a separate backing layer.

The component for a spiral wound membrane, when operable to allow permeate to flow as a combined permeate carrier and backing layer, may provide ≥10% reduction in pressure drop and/or ≥10%, more preferably ≥20%, increase in permeate flux in a spiral wound membrane compared to a comparative component as previously defined additionally with a separate backing layer in the membrane envelope.

The component for a spiral wound membrane according to any aspect of the present invention may be prepared by additive manufacturing. The additive manufacturing technique may be any suitable 3D printing technology. For example, the component for a spiral wound membrane according to any aspect of the present invention may be printed using stereolithography, digital light processing, two-photon polymerisation, two colour photo-polymerisation, inkjet printing, binder jet printing, stereolithography (SLA), direct ink writing, three-dimensional printing, selective laser sintering, selective laser melting, laminated object manufacturing, or fused deposition modelling.

Preferably, the component for a spiral wound membrane according to any aspect of the present invention is prepared by SLA.

The component for a spiral wound membrane according to any aspect of the present invention may comprise a polymeric material, a ceramic material, a composite material, an inorganic-organic material and/or a metal material.

The component for a spiral wound membrane according to any aspect of the present invention may be formed from materials selected from UV cured thermoset precursor materials; polycarbonate based materials such as Accura 5530, Accura 60, Accura 55; acrylonitrile butadiene styrene based materials such as Renshape SL7820, Somos Watershed XC 11122, Accura Xtreme White 200, Somos 14120; polypropylene based materials such as Somos 9120, Acurra 25, Samos NeXT; polyethylene based materials such as VisiJet SL Flex; epoxy based materials such as Epoxy SL5170; acrylic based materials such as Accura Xtreme, Accura Xtreme 200 or any combination thereof.

Advantageously, the component for a spiral wound membrane of the present invention can produced with improved ease of processing and/or low cost.

The active layer may have a lamellar structure comprising at least two layers of two-dimensional material, and wherein the two-dimensional material comprises graphene or a derivative thereof and/or a transition metal dichalcogenide (TMD). The transition metal dichalcogenide of any aspect of the present invention may be according to formula (1):

$$M_aX_b, \tag{I}$$

wherein with M is a transition metal atom, such as Mo, W, Nb and Ni;

X is a chalcogen atom, preferably S, Se, or Te;

wherein $0<a\leq1$ and $0<b\leq2$.

The transition metal dichalcogenide of any aspect of the present invention be selected from one or more of $MoS_2$, $MoSe_2$, $WS_2$, $WSe_2$, $Mo_aW_{1-a}S_2$, $Mo_aW_{1-a}Se_2$, $MoS_bSe_{2-b}$, $WS_bSe_{2-b}$, or $Mo_aW_{1-a}S_bSe_{2-b}$, where $0<a\leq1$ and $0<b\leq2$, or combination thereof. Preferably, the transition metal dichalcogenide is selected from $MoS_2$, $WS_2$, $MoSe_2$, $WSe_2$. Most preferably from $MoS_2$ and $WS_2$. Such transition metal dichalcogenide is available commercially from ACS Material.

The transition metal dichalcogenide according to any aspect of the present invention may be in the form of flakes having an average size of from 1 nm to 5000 nm, such as between 50 nm to 750 nm, 75 nm to 500 nm, 100 nm to 400 nm, for example 130 nm to 300 nm, 150 nm to 290 nm, or 160 nm to 280 nm, suitably 170 nm to 270 nm, 180 nm to 260 nm or preferably 190 nm to 250 nm. Suitably, the size distribution of the transition metal dichalcogenide flakes is such that at least 30 wt % of the transition metal dichalcogenide flakes have a diameter of between 1 nm to 5000 nm, such as between 50 nm to 750 nm, 75 nm to 500 nm, 100 nm to 400 nm, for example 130 nm to 300 nm, 150 nm to 290 nm, or 160 nm to 280 nm, suitably 170 nm to 270 nm, 180 nm to 260 nm or preferably 190 nm to 250 nm more preferably at least 40 wt %, 50 wt %, 60 wt %, 70 wt % and most preferably at least 80 wt % or at least 90 wt % or 95 wt % or 98 wt % or 99 wt %. The size of the transition metal dichalcogenide thereof and size distribution may be measured using transmission electron microscopy (TEM, JEM-2100F, JEOL Ltd. Japan).

For example, lateral sizes of the two-dimensional layers across a sample may be measured using transmission electron microscopy (TEM, JEM-2100F, JEOL Ltd. Japan), and the number ($N_i$) of the same sized nanosheets ($M_i$) measured. The average size may then be calculated by Equation 1:

$$\text{Average size} = \sum_{i=1}^{\infty} N_i M_i \Big/ \sum_{i=1}^{\infty} N_i$$

where $M_i$ is diameter of the nanosheets, and $N_i$ is the number of the size with diameter $M_i$.

The transition metal dichalcogenide may be in the form of a monolayer or multi-layered particle or flake, preferably a monolayer. The transition metal dichalcogenide flakes may be formed of single, two or few layers of transition metal dichalcogenide, wherein few may be defined as between 3 and 100 layers. Suitably, the transition metal dichalcogenide flakes comprise between 1 to 100 layers, such as between 2 to 75 layers or 5 to 50 layers or 10 to 25 layers. Suitably, at least 30 wt % of the transition metal dichalcogenide comprise between 1 to 30 layers, such as between 5 to 30 layers or 5 to 10 layers, more preferably at least 40 wt %, 50 wt %, 60 wt %, 70 wt % and most preferably at least 80 wt % or at least 90 wt % or 95 wt % or 98 wt % or 99 wt %. The number of layers in the transition metal dichalcogenide flakes thereof may be measured using atomic force microscopy (AFM or transmission electron microscopy (TEM)) (TT-AFM, AFM workshop Co., CA, USA).

Suitably, the d-spacing between adjacent lattice planes in the transition metal dichalcogenide or mixture thereof is from 0.34 nm to 5000 nm, such as from 0.34 nm to 1000 nm, or from 0.4 nm to 500 nm, or from 0.4 nm to 250 nm, such as from 0.4 nm to 200 nm, or from 0.4 nm to 150 nm, or from 0.4 nm to 100 nm, or from 0.4 nm to 50 nm, or from 0.4 nm to 25 nm, or from 0.4 nm to 10 nm, or from 0.4 nm to 8 nm, such as from 0.4 nm to 7 nm, from 0.45 nm to 6 nm, 0.50 nm to 5 nm, or 0.55 nm to 4 nm, or 0.6 nm to 3 nm, for example 0.6 nm to 2.5 nm, 0.6 nm to 1 nm, 0.6 nm to 2 nm, or 0.6 nm to 1.5 nm.

The average size of the transition metal dichalcogenide may be at least 80% of the average pore size of the substrate. For example, for average pore size of the substrate of 200 nm, the flake may have an average size of at least 160 nm. Suitably, the average size of the transition metal dichalcogenide is equal to or larger than the average pore size of the porous substrate, such as at least 100%, or at least 110%, or at least 120% of the average pore size of the substrate.

The active layer may comprise materials, suitably two-dimensional materials, other than the transition metal dichalcogenide thereof. For example, other materials of the active layer may be selected from one or more of silicene, germanene, stanene, boron-nitride, suitably h-boron nitride, carbon nitride, metal-organic nanosheets, graphene, graphene oxide, reduced graphene oxide functionalised graphene oxide and polymer/graphene aerogel.

The active layer may comprise additives to tailor the properties of the active layer, such as other metals; and/or fibres, such as metal oxide nanostrands; and/or dopants, e.g.

Au, Fe, Cu, $Cu(OH)_2$, $Cd(OH)_2$ and $Zr(OH)_2$. Such additives may be added to the membrane to control the interlayer distance and/or create nanochannels for high water flux rate. Any type of suitable fibres, such as continuous or chopped fibres, having diameter of 0.5 nm-1000 nm may be incorporated within the membrane. Preferably, the fibres are removed before use, such as by mechanical removal or by dissolution, etc.

The addition of additives may be carried out by addition of the additives to the coating composition or depositing additives with desired functionality on the membrane surface.

The method of applying the active layer composition to the filtration membrane layer may comprise the step of applying a coating composition comprising the transition metal dichalcogenide onto the support layer.

The method may comprise contacting the coating composition onto support layer using gravity deposition, vacuum deposition, pressure deposition; printing such as inkjet printing, aerosol printing, 3D printing, offset lithography printing, gravure printing, flexographic printing techniques, pad printing; curtain coating, dip coating, spin coating, and other printing or coating techniques known to those skilled in the art.

Further details of the application methods are disclosed in published PCT patent application WO2019/122828, specifically, paragraphs [73] to [77] inclusive. The entire contents paragraphs [73] to [77] inclusive thereof are fully incorporated herein by reference.

The active layer coating composition may be a liquid composition comprising a liquid medium and the transition metal dichalcogenide. The coating compositions of the present invention may comprise solvent, non-solvent or solventless, and may be UV curable compositions, e-beam curable compositions etc. When formulated as a liquid composition for use in the invention, e.g. as a solution, dispersion or suspension, a suitable carrier liquid or solvent may be aqueous or organic, and other components will be chosen accordingly. For example, the liquid carrier may comprise water or an organic solvent such as ethanol, terpineol, dimethylformamide N-Methyl-2-pyrrolidone, isopropyl alcohol, mineral oil, ethylene glycol, or their mixtures, optionally with other materials to enhance performance and/or rheology of the composition including any one or more of binders, drying additives, antioxidants, reducing agents, lubricating agents, plasticisers, waxes, chelating agents, surfactants, pigments, defoamers and sensitisers.

Further details of the active layer composition are disclosed in published PCT patent application WO2019/122828, specifically, paragraphs [46] to [61] inclusive. The entire contents paragraphs [46] to [61] inclusive thereof are fully incorporated herein by reference.

The graphene or derivative thereof may be selected from one or more of graphene oxide, reduced graphene oxide, hydrated graphene and amino-based graphene, alkylamine functionalised graphene oxide, ammonia functionalised graphene oxide, amine functionalised reduced graphene oxide, odadecylamine functionalised reduced graphene oxide, and/or polymer graphene aerogel. Preferably, the graphene or derivative thereof is graphene oxide. Graphene and its derivatives may be obtained commercially from Sigma-Aldrich.

Suitably, the graphene or derivative thereof, preferably graphene oxide, comprises hydroxyl, carboxylic and/or epoxide groups. The oxygen content of the graphene or derivative thereof, preferably graphene oxide, may be 0% to 60% oxygen atomic percentage, such as 0% to 50% or 0% to 45% oxygen atomic percentage. Suitably, the oxygen content is from 20% to 25% or from 25% to 45%.

Advantageously, when the water content is between 25% to 45% a surfactant may not be present in the composition. Preferably, the oxygen content is from 30% to 40% oxygen atomic percentage. Such a range can provide improved stability despite the absence of other stabilising components. Suitably, when the graphene or derivative is reduced graphene oxide, the oxygen content is from 5% to 20% oxygen atomic percentage. Oxygen content can be characterised by X-ray photoelectron spectroscopy (XPS).

The graphene or derivative thereof, suitably graphene oxide, may be optionally substituted with further functional groups. The optional functional groups may be grafted functional groups, and preferably grafted via reaction with the existing hydroxyl, carboxylic and epoxide groups of the graphene or derivative thereof. Functionalisation includes covalent modification and non-covalent modification. Covalent modification method can be subcategorised to nucleophilic substitution reaction, electrophilic substitution reaction, condensation reaction, and addition reaction. Examples of optional functional groups are amine groups; aliphatic amine groups, such as long-chain (e.g. $C_{18}$ to $C_{50}$) aliphatic amine groups; porphyrin-functionalised secondary amine groups, and/or 3-amino-propyltriethoxysilane groups. The graphene or derivative thereof may comprise amino groups, suitably grafted amino groups, and preferably to graphene oxide. Such functionalisation can provide for the improved selective sieving of ferric acid.

The graphene or derivative thereof according to any aspect of the present invention may be in the form of flakes having a size of from 1 nm to 5000 nm, such as between 50 nm to 750 nm, 100 nm to 500 nm, 100 nm to 400 nm. The graphene or derivative thereof according to any aspect of the present invention may be in the form of flakes having a size of from 100 nm to 3500 nm, such as from 200 nm to 3000 nm, 300 nm to 2500 nm or 400 nm to 2000 nm, preferably from 500 nm to 1500 nm. The graphene or derivative thereof according to any aspect of the present invention may be in the form of flakes having a size of from 500 nm to 4000 nm, 500 nm to 3500 nm, 500 nm to 3000 nm, 750 nm to 3000 nm, 1000 nm to 3000 nm, such as 1250 nm to 2750 nm or preferably 1500 nm to 2500 nm. Suitably, the size distribution of the graphene flakes or derivative thereof is such that at least 30 wt % of the graphene flakes or derivative thereof have a diameter of between 1 nm to 5000 nm, such as between 1 nm to 750 nm, 100 nm to 500 nm, 100 nm to 400 nm; or between 100 nm to 3500 nm, such as from 200 nm to 3000 nm, 300 nm to 2500 nm or 400 nm to 2000 nm, preferably from 500 nm to 1500 nm; or between 500 nm to 4000 nm, 500 nm to 3500 nm, 500 nm to 3000 nm, 750 nm to 3000 nm, 1000 nm to 3000 nm, such as 1250 nm to 2750 nm or preferably 1500 nm to 2500 nm, more preferably at least 40 wt %, 50 wt %, 60 wt %, 70 wt % and most preferably at least 80 wt % or at least 90 wt % or 95 wt % or 98 wt % or 99 wt %. The size of the graphene flakes or derivative thereof and size distribution may be measured using transmission electron microscopy (TEM, JEM-2100F, JEOL Ltd. Japan).

The graphene or derivative thereof may be in the form of a monolayer or multi-layered particle, preferably a monolayer. The graphene flakes or derivative thereof may be formed of single, two or few layers of graphene or derivative thereof, wherein few may be defined as between 3 and 20 layers. Suitably, the graphene flakes or derivative thereof comprise between 1 to 15 layers, such as between 2 to 10 layers or 5 to 15 layers. Suitably, at least 30 wt % of the graphene flakes or derivative thereof comprise between 1 to 15 layers, such as between 1 to 10 layers or 5 to 15 layers, more preferably at least 40 wt %, 50 wt %, 60 wt %, 70 wt % and most preferably at least 80 wt % or at least 90 wt % or 95 wt % or 98 wt % or 99 wt %. The number of layers in the graphene flakes or derivative thereof may be measured using atomic force microscopy (AFM or transmission electron microscopy (TEM)) (TT-AFM, AFM workshop Co., CA, USA).

Suitably, the d-spacing between adjacent lattice planes in the graphene or derivative thereof is from 0.34 nm to 1000 nm, such as from 0.34 nm to 500 nm, or from 0.4 nm to 500 nm, or from 0.4 nm to 250 nm, such as from 0.4 nm to 200 nm, or from 0.4 nm to 150 nm, or from 0.4 nm to 100 nm, or from 0.4 nm to 50 nm, or from 0.4 nm to 25 nm, or from 0.4 nm to 10 nm, or from 0.4 nm to 5 nm, such as from 0.45 nm to 4 nm, from 0.5 nm to 3 nm, 0.55 nm to 2 nm, or 0.55 nm to 1.5 nm, or 0.6 nm to 1.2 nm, for example 0.6 nm to 1.1 nm, 0.6 nm to 1 nm, 0.6 nm to 0.9 nm, or 0.6 nm to 0.8 nm.

The active layer may comprise materials, suitably two-dimensional materials, other than graphene or derivatives thereof. For example, other materials of the active layer may be selected from one or more of silicone, germanene, stanene, boron-nitride, suitably h-boron nitride, carbon nitride, metal-organic nanosheets, molybdenum disulfide, and tungsten disulfide, polymer/graphene aerogel.

The materials of the active layer may be produced using any of the suitable methods known to the skilled person. Two-dimensional silicone, germanene and stanene may be produced by surface assisted epitaxial growth under ultra-high vacuum. Hexagonal two-dimensional h-boron nitride may be produced by several methods, such as mechanical cleavage, unzipping of boron nitride nanotubes, chemical functionalisation and sonication, solid-state reaction and solvent exfoliation and sonication. Among these methods, chemical method has been found to provide the highest yield. For example, h-boron nitride may be synthesised on single-crystal transition metal substrates using borazine as boron and nitride sources. Two-dimensional carbon nitride can be prepared via direct microwave heating of melamine and carbon fibre. Metal-organic frameworks (MOFs) can be produced by in-situ solvothermal synthesis method by mixing ingredients at high temperatures such as 100-140° C., followed by filtration. Two-dimensional molybdenum disulfide can be obtained by a few methods, such as mechanical exfoliation, liquid exfoliation and chemical exfoliation. Among these methods, chemical exfoliation has been found to provide high yield. One example is chemical exfoliation using lithium to chemically exfoliate molybdenum disulfide using centrifuge and filtration. Two-dimensional tungsten disulfide can be prepared by a deposition-thermal annealing method: vacuum deposition of tungsten and followed by thermal annealing by addition of sulphur. Polymer/graphene aerogel can be produced via coupling and subsequent freeze-drying using polyethylene glycol grafted graphene oxide.

Preferably, the active layer is substantially formed from two-dimensional material, suitably of graphene or a derivative thereof, more preferably graphene oxide or reduced graphene oxide, most preferably graphene oxide.

The membrane may comprise two or more discrete portions of active layers on the substrate.

The method of applying the active layer composition to the filtration membrane layer may comprise the step of applying a coating composition comprising the graphene or derivative thereof onto the support layer.

The method may comprise contacting the coating composition onto the support layer using gravity deposition, vacuum deposition, pressure deposition; printing such as inkjet printing, aerosol printing, 3D printing, offset lithography printing, gravure printing, flexographic printing techniques, pad printing; curtain coating, dip coating, spin coating, and other printing or coating techniques known to those skilled in the art.

Further details of the application methods are disclosed in published PCT patent application WO2019106344, specifically, paragraphs [47] to [49] and [61] to [69] inclusive. The entire contents paragraphs [47] to [49] and [61] to [69] inclusive thereof are fully incorporated herein by reference.

The active layer coating composition may be a liquid composition comprising a liquid medium and the graphene or derivative thereof. The coating compositions of the present invention may comprise solvent, non-solvent or solventless, and may be UV curable compositions, e-beam curable compositions etc. When formulated as a liquid composition for use in the invention, e.g. as a solution, dispersion or suspension, a suitable carrier liquid or solvent may be aqueous or organic, and other components will be chosen accordingly. For example, the liquid carrier may comprise water or an organic solvent such as ethanol, terpineol, dimethylformamide N-Methyl-2-pyrrolidone, isopropyl alcohol, mineral oil, ethylene glycol, or their mixtures, optionally with other materials to enhance performance and/or rheology of the composition including any one or more of binders, drying additives, antioxidants, reducing agents, lubricating agents, plasticisers, waxes, chelating agents, surfactants, pigments, defoamers and sensitisers.

Further details of the active layer composition are disclosed in published PCT patent application WO2019106344, specifically, paragraphs [51] to [60] inclusive. The entire contents paragraphs [51] to [60] inclusive thereof are fully incorporated herein by reference.

Alternatively, the active layer may comprise a metal-organic framework.

The active layer comprises one or more metal-organic frameworks (MOFs).

The metal-organic framework materials of any aspect of the present invention may be one-dimensional, two-dimensional or three-dimensional. Preferably, the MOF is porous. The MOF may comprise a network of secondary building units (SBUs), or metal ion core/metal subunit cluster core nodes, and organic linkers (or ligands) connecting the SBUS or nodes.

The MOF may be in continuous phase in the active layer, or may be in the form of flakes and/or particles. A MOF synthesised in the presence of substrate may be in the form of continuous phase. A MOF formed prior to contact with the substrate may be in the form of flakes and/or particles.

The SBUs or nodes, being sub units of the MOF, may comprise metal selected from one or more transition metal cations, such as one or more of Cr(II), Fe(II), Fe(III), Al(III), Co(II), Ru(III), Os(III), Hf(IV), Ni, Mn, V, Sc, Y(III), Cu(II), Cu(I), Zn(II), Zr(IV), Cd, Pb, Ba, Ag (I), Au, AuPd, Ni/Co, lanthanides, actinides, such as Lu, Tb(III), Dy(III), Ho(III), Er(III), Yb(III). Preferably Cr(III), Fe(II), Fe(III), Al(III), Co(II), Ru(III), Os(III), Hf(IV), Ni, Mn, V, Sc, Y(III), Cu(II), Cu(I), Zn(II), Zr(IV), Cd, Pb, Ba, Ag (1), Ni/Co, lanthanides, actinides, such as Lu, Tb(III), Dy(III), Ho(III), Er(III), Yb(III). More preferably Cr(III), Fe(II), Fe(III), Al(III), Co(II), Hf(IV), Ni, Mn, V, Sc, Y(III), Cu(II), Cu(I), Zn(II), Zr(IV), Cd, Pb, Ag (1), Ni/Co, lanthanides, actinides, such as Lu, Tb(III), Dy(III), Ho(III), Er(III), Yb(III), more preferably Cr(III), Fe(II), Fe(III), Al(III), Co(II), Hf(IV), Ni, Mn, V, Y(III), Cu(II), Cu(I), Zn(II), Zr(IV), Cd, Ag (1), Ni/Co, lanthanides, actinides, such as Lu, Tb(III), Dy(III), Ho(III), Er(III), Yb(III). The secondary building unit (SBU) may comprise: three, four, five, six, eight, nine, ten, eleven, twelve, fifteen or sixteen points of extension.

The SBU or node may be a transition-metal carboxylate cluster. The SBUs or nodes may be one or more selected from the group consisting of $Zn_4O(COO)_6$, $Cu_2(COO)_4$, $Cr_3O(H_2O)_3(COO)_6$, and $Zr_6O_4(OH)_{10}(H_2O)_6(COO)_6)$, $Mg_2(OH_2)_2(COO)$, $RE_4(\mu_3\text{-}O)_2(COO)_8$, $RE_4(\mu_3\text{-}O)_2$, wherein RE is Y(III), Tb(III), Dy(III), Ho(III), Er(III), and/or Yb(III)). The structures of SBUs can be identified by X-Ray diffraction using methods well known to the skilled person.

Organic linkers suitable for use in the present invention include those operable to be used to form MOFs for water treatment, molecule separation and biofiltration related applications. Such linkers may form strong bonds to metal cores, provide large pore sizes, provide high porosity, provide selective absorption and/or capacity.

The organic linkers of the MOF may be formed from a wide range of organic molecules, such as one or more carboxylate linkers; N-heterocyclic linkers; phosphonate linkers; sulphonate linkers, metallo linkers, such a carboxylate-metallo linkers; and mixtures and derivatives thereof.

The organic linkers may comprise one or more of ditopic, tritopic, tetratopic, hexatopic, octatopic linkers. The organic linkers may comprise desymmetrised linkers.

The organic linkers may comprise one or more ditopic carboxylate linkers, such as one or more of the group consisting of 4,4'-biphenyldicarboxylate (bpdc), 2,2'-dicyano-4,4'-biphenyldicarboxylate (CNBPDC), 9,10-anthracenedicarboxylate (adc), 4,4'-azobenzenedicarboxylate (abdc), 1,3-bis(3,5-dicarboxylphenylethynyl)benzene (bdpb), 2,2'-bipyridyl-5,5'-dicarboxylate (bpydc), 2,2'-dihydroxy-1,1'-binaphthalene-5,5'-dicarboxylate (5,5'-bda), 2-bromobenzene-1,4-dicarboxylate (brbdc), 1,4-benzenedicarboxylates (BDC), BDC-Br, BDC-NH2, BDC-OC3H7, BDC-OC5H11, BDC-cycC2H4, BDC-ben, 2-bromo-1,4-benzenedicarboxylate (o-Br-bdc), BDC-F, BDC-Cl, BDC-Br, BDC-I, BDC-F$_4$, BDC-Cl$_4$, BDC-Br$_4$, BDC-I$_4$, BDC-(CH3)4, 2,5-dihydroxy-1,4-benzenedicarboxylate (DHBDC), thieno[3,2-b]thiophene-2,5-dicarboxylic acid (TTDC), thiophene-2,5-dicarboxylate (tdc), di-thieno-[3,2-b;2',3'-d]-thiophene-2,6-dicarboxylate (DTTDC), naphthalenedicarboxylate (NDC), 4,4'-benzophenone dicarboxylate (BPNDC), 4,4'-biphenyidicarboxylate (BPDC), 2,2'-dicyano-4,4'-biphenyidicarboxylate (CNBPDC), pyrene-2,7-dicarboxylate (PDC), p,p'-terphenydicarboxylic acid (TPDC), amino-TPDC, pyridine 2,6-dicarboxylic acid HPDC, Thiol functionalised DMBD, azide-functionalized 2,3,5,6-tetramethylbenzene-1,4-dicarboxylate (TBDC), tetraanionic 2,5-dioxido-1,4-benzene-dicarboxylate (BOBDC/DHBDC/DOT).

The organic linkers may comprise one or more tritopic carboxylate linkers, such as one or more of the group consisting of 1,3,5-benzenetricarboxylate (btc), biphenyl-3,4',5-tricarboxylate (bhtc), 4,4',4"-benzene-1,3,5-triyl-benzoate (btb), 4,4',4"-(triazine-2,4,6-triyltris(benzene-4,1-diyl)) tribenzoate (tapb), 4,4',4"-benzene-1,3,5-triyl-benzoate, 4,4',4"(benzene-1,3,5-triyltris(ethyne-2,1-diyl))tribenzoate (bte), 4,4',4"-(benzene-1,3,5-triyl-tris(benzene-4,1-diyl)) tribenzoate (bbc).

The organic linkers may comprise one or more tetratopic carboxylate linkers, such as one or more of the group consisting of 1,1'-azobenzene-3,3',5,5'-tetracarboxylate (abtc), azoxybenzene-3,3',5,5'-tetracarboxylate (aobtc), 4,4'- bipyridine-2,6,2',6'-tetracarboxylate (bpytc), such as (4',4",4"',4""-methanetetrayftetrabiphenyl4-carboxylate, mtbc), 4,4',4",4"'-Methanetetrayltetrabenzoic acid (MTB), benzene-substituted 4,4',4",4"'-Methanetetrayltetrabenzoic acid MTTB, 4,4',4"-tricarboxyltriphenylamine (TCA), 4,4',4",4"-tetrakiscarboxyphenylsilane (TCPS), 2-thiophenecarboxylic acid (HTPCS), methanetetra(4-benzoate) (MTBA), 1,3,5,7-adamantane tetracarboxylate (act), N,N,N',N'-tetrakis(4-carboxyphenyl)-1,4-phenylenediamine (TCPPDA), 5,5'-(1,2-ethynediyl)bis(1,3-benzenedicarboxylate) (ebdc), 3,3',5,5'-biphenyttetracarboxylate (bptc), 3,3',5,5'-erphenyttetracarboxylate, 3,3',5,5'-quaterphenyltetracarboxylate, 3,3',5,5'-pentaphenyttetracarboxylate, 5,5'-(9,10-anthracenediyl)diisophthalate (adip), 3,3',5,5'-tetra-(phenyl-4-carboxylate), 9,9'-([1,1'-bipheny]-4,4'-diyl)bis(9H-carbazole-3,6-dicarboxylate) (bbcdc).

The organic linkers may comprise one or more hexatopic carboxylate linkers, such as one or more of the group consisting of 5,5',5"-[1,3,5-benzenetriyltris(carbonylimino)]tris-1,3-benzenedicarboxylate, 5,5',5"-(((benzene-1,3,5-triyl-tris(ethyne-2,1-diyl))-tris(benzene-4,1-diyl))tris(ethyne-2,1-diyl))triisophthalate (ttei), 1,3,5-tris[((1,3-carboxylic acid-5-(4 (ethynyl)phenyl))ethynyl)phenyl]benzene, 3,3',3",5,5',5"-benzene-1,3,5-triyl-hexabenzoate (bhb), 4,4',4"-tris(N,N-bis(4-carboxylphenyl)-amino)triphenylamine (H6tta), 1,3,5-tris[(1,3-di(4'-carboxylic acid-phenyl)-phenyl)-5-ethynyl]benzene](H6L1), tris-(4-(5'-ethynyl-1,1':3',1"-terphenyl-4,4"-dicarboxylic acid)-phenyl)-amine] (H6L2), 1,1':3',1"-terphenyl-4,4"-dicarboxylate.

The organic linkers may comprise one or more metallo linkers, such as one or more of the group consisting of [FeFe]-1,4-dicarboxylbenzene-2,3-dithiolate (dcbdt), Cu(I)-1,10-phenanthroline-based linker, 5,10,15,20-Tetrakis(4-carboxyphenyl)porphyrin metalloporphrin linker (tcpp), Au(I)-4,4',4",4"'-(1,2-phenyenebis(phosphanetriyl))-tetrabenzoate (pbptbc), 4,7-bis(4-carboxylphenyl)-1,3-dimethybenzimidazolium-tetrafluoroborate, [(R,R)-(2)-1,2-cyclohexanediamino-N,N'-bis(3-tert-butyl-5-(4-pyridyl)salicylicdene)-Mn(III)Cl].

The organic linkers may comprise one or more octatopic carboxylate linkers, such as one or more of the group consisting of 5,5',5",5"'-silanetetrayltetraisophthalate (L6), 1,1'-binaphthyl-derived octacarboxylate linkers, 2,2'-diethoxy-1,1'binapthyl-4,4',6,6'-tetracarboxylic acid (L12) and elongated L12 (L13, wherein a —C≡C— moiety is present in each arm of L12).

The organic linkers may comprise one or more N-heterocyclic linkers such as one or more of the group consisting of 2,5-bis-(2-hydroxyethoxy)-1,4-bis(4-pyridyl)benzene, 4,4'-dipyridylacetylene (dpa), pyrazine, imidazolate or derivative thereof, such as 1,4-bis(imidazolyl)-benzene and 1,5-bis(imidazol-1-ylmethyl)naphthalene, imidazole (Him), 2-methylimidazole, 2-ethyl imidazole, 2-nitro imidazole, 4-isocyanoimidazole, 4,5-dichloroimidazole, imidazole-2-carbaldehyde, imidazo[4,5-b]pyridine, benzo[d]imidazole, 6-chloro-benzo[d]imidazole, 5,6-dimethyl-benzo[d]imidazole, 6-methyl-benzo[d]imidazole, 6-bromo-benzo[d]imidazole, 6-nitro-benzo[d]imidazole, imidazo[4,5-c]pyridine, purine pyrazole (Hpz), 1,2,4-triazole (Htz), 1,2,3-triazole (Hta), and tetrazole (Httz), 5-chlorobenzimidazolate (cblm), 1,3,5-tris(1H-pyrazol-4-yl)benzene, 2,2'-bipyridine (BIPY), 2-phenylpyridine-5,4-dibenzoate (PPY-DC), 2,2 bipyridine-5,5-dibenzoate (BPY-DC).

The organic linkers may comprise one or more phosphonate linkers, such as one or more of the group consisting of phosphonate-oxalate, alkylphosphonic acids wherein alkyl is C1 to C10, such as methylphosphonic acid, $(H_2O_3P(CH_2)_nPO_3H_2)$ $(C_n)$) wherein n is 1 to 10, methylenebisphosphonate, alkylbis(phosphonic acid); methylenebis(phosphonic acid), N,N'-piperazinebis(methylenephosphonic acid), para-sulfonylphenylphosphonic acid, N,N'-4,4'-bipiperidinebis(methylenephosphonic acid), N,N'-piperazinebis(methylenephosphonic acid), N,N'-2-methylpiperazinebis(methylenephosphonic acid), arylphosphonate, 4-carboxyphenylphosphonic acid (4-cppH3), 1,3,5-benzenetris(phosphonic acid), tris-1,3,5-(4-phosphonophenyl)-benzene (H6L), biphenylbisphosphonate, bipyridylphosphonates, methylphosphonates, or functionalised phosphate linkers, such as 2'-bipyridyl-5,5'-bis(phosphonic acid).

The organic linkers may comprise one or more sulphonates, such as one or more of the group consisting of 4-biphenylsulfinate, 2-naphthalenesulfonate, 1-naphthalenesulfonate, 1-pyrenesulfonate, 1,5-naphthalenedisulfonate, 2,6-naphthalenedisulfonate, 1-naphthalene sulfonate, p-toluenesulfonate and 1,3,6,8-pyrenetetrasulfonate; 1,3,5-tris(sulfonomethyl)benzene; α, α', α"', α""-durenetetrasulfonate, 1,3,5,7-tetra(4-sulfonophenyl)adamantane, 1,3,5,7-tetra(4-sulfonophenyl)adamantane, 1,3,5,7-tetra(4-sulfonophenyl)adamantane; (4,4'-bis(sulfoethynyl)biphenyl; 4,4'-biphenyidisulfonate, p-sulfonatocalix[4]arene, p-sulfonatocalix[5]arene, p-sulfonatocalix[6]arene, p-sulfonatocalix[8]arene.

The organic linkers may comprise an elongated organic linker, such an elongated linker may have a weight average molecular weight (Mw) of up to 1500 Da, such as up to 1300 Da, up to 1300 Da, up to 1100 Da, up to 1000 Da, up to 900 Da, up to 850 Da, up to 800 Da, or up to 750 Da. The elongated linker may be a tritopiclinker, such as one or more selected from the group consisting of 4,4',4"-s-triazine-1,3,5-triyltri-p-aminobenzoate (tatab), 4,4',4"-(1,3,4,6,7,9,9-heptaazaphenalene-2,5,8-triyl)tribenzoate (htb), 4,4',4"-s-triazine-2,4,6-triyl-tribenzoate (tatb), 4,4',4"-(benzene-1,3,5-triyl-tris(benzene-4,1-diyl))tribenzoate (bbc), bipyridine (bpy); or an elongated BPY- or PPY-containing dicarboxylate linker, such as di-benzoate-substituted 2,2'-bipyridine (bpy-dc), di-benzoate-substituted 2-phenylpyridine (ppy-dc); or a ditopic carboxylate linker containing three phenylene groups and two acmtylene groups; or 3,3'-(naphthalene-2,7-diyl)dibenzoate, 5,5'-(naphthalene-2,7-diyl)-diisophthalate, 3,3'-(naphthalene-2,7-diyl)-dibenzoate, 4,4'-azanediyldibenzoate, 4,4'-bipyridine (L4), 4,4'-azobis(pyridine) (L5).

The organic linkers may comprise a mixture of different organic linkers, for example a mixture of ditopic and ditopic linkers, such as 9,10-bis(triisopropylsilyloxy)phenanthrene-2,7-dicarboxylate (tpdc) and 3,3',5,5'-tetramethyl-4,4'-biphenydicarboxytate (Me4bpdc); or a ditopic linker plus tritopic linker, such as carboxylate-pyridine linkers, for example, dipyridytfunctionalized chiral Ti(salan) and 4,4'-biphenyldicarboxylate (bpdc).

The linker may be selected from one or more selected from the group consisting of diacetylene-1,4-bis-(4-benzote), 2-methylpiperazine, piperazine (pip), 4,4,4-methanetriyltris(2,3,5,6-tetrachlorobenzoate) (ptmtc), F-H2PDA, CDDB, 5-NH2-mBDC, dhtpa, pDBI, H31mDC, hexaflurosilicate, fumaric acid, muconic acid, olsalazine, 5,5',5"-(2-aminobenzene-1,3,5-triyl)tris(ethyne-2,1-diyl)triisophthalic acid (abt), acetytacetonate (acac), 5,5'-(9,10-anthracenediyl)diisophthalate (adip), 3-aminopropyftrialkoxysilane (aps), 1,3-azulenedicarboxytate (azd), N,N'-bis(3,5-dicarboxyphenyl)pyromellitic diimide (bdcppi), 5,5'-(buta-1,3-diyne-1,4-diyl)diisophthalate (bddc/bdi), 1,4-benzenedi(4'-pyrazolyl)(bpd), 1,4-benzeneditetrazolate (bdt), 1,2-bis(4-pyridyl)ethane (bpe), 3,6-di(4-pyridyl)-1,2,4,5-tetrazine (bpta, dpt, or diPyTz), 4,4',4'',4'''-benzene-1,2,4,5-tetrayltetrabenzoate (btatb, same as TCPB), bis(1H-1,2,3-triazolo[4,5-b],-[4',5'-i])dibenzo[1,4]-dioxin (btdd), 5,5',5''-benzene-1,3,5-triyltris (1-ethynyl-2-isophthalate) (btei), 1,3,5-benzenetristetrazolate (btt), 5,5',5''-(benzene-1,3,5-triyl-tris(biphenyl-4,4'-diyl))triisophthalate (btti), 1,12-dicarboxyl-1,12-dicabracloso-dodecarborane (cdc), 4-(α,α,α-trifluoromethyl) pyridine (CF3Py), 4-carboxycinnamate (cnc), 1,4,8,11-tetraazacyclotetradecane (cyclam), 1,4-diazabicyclo[2.2.2] octane (dabco), 1,2-dihydrocyclobutabenzene-3,6-dicarboxylate (dbdc), 6,6'-dichloro-2,2'-dibenzyloxy-1,1'-binaphthyl-4,4'-dibenzoate (dcbBn), 3,5-dicyano-4-(4-carboxyphenyl)-2,20:6,4''-terpyridine (dccptp), 6,6'-dichloro-2,2'-diethoxy-1,10-binaphthyl-4,4'-dibenzoate (dcdEt), diethytformamide (def), diethylenetriamine (deta), 2,5-dihydroxyterephthalate (dhtp), N,N'-di-(4-pyridyl)-1,4, 5,8-naphthalenetetracarboxydiimide (diPyNI), 1,4-diazabicyclo[2.2.2]octane (dabco), 2,5-dioxido-1,4-benzenedicarboxytate (dobdc) meso-1,2-bis(4-pyridyl)-1,2-ethanediol (dpg), 5,5'-(1,2-ethynediyl)bis(1,3-benzenedicarboxylate) (ebdc), ethylene diamine (ed), 4-ethylpyridine (EtPy), 4,4'-(idene hexafluoroisopropylidene)-dibenzoate (hfipbb), fumarate (fma), 5-fluoropyrimidin-2-olate (F-pymo), 2-fluoro-4-(1H-tetrazole-5-yl)benzoate (2F-4-tba), 4,5,9,10-tetrahydropyrene-2,7-dicarboxylate (hpdc), 1,3,4,6,7,8-hexahydro-2H-pyrimido[1,2-a]pyrimidine (hpp), 4,5-imidazoledicarboxylate (ImDC), isonicotinate (in), 5,5'-methylene diisophthalate (mdip), 1-methylimidazole (MeIM), 4-methylpyridine (MePy), mercaptonicotinate (mna), methanetetrabenzoate (mtb), 4,4',4''-nitrilotrisbenzoate (ntb), 4',4'',4'''-nitrilotribiphenyl-3,5-dicarboxylate (ntbd), naphthalene-1,4,5,8-tetracarboxylate (ntc), 5,5',5''-(4,4',4''-nitrilotris(benzene-4,1-diyl)tis(ethyne-2,1-diyl)) trisophthalate (ntei), oxidiacetate (oxdc), 4-(4-pyridyl) benzoate (pba), pyridine-3,5-bis(phenyl-4-carboxylate) (pbpc), p-phenylenediacylate (pda), pyridinedicarboxylate (pdc), 5-(pyridin-3-ylethynyl)isophthalate (peip), 4,6-pyrimidinedicarboxylate (PmDC), 5-[(pyridin-3-ylmethyl)amino] isophthalate (pmip), diphenylmethane-3,3',5,5'-tetrakis(3,5-bisbenzoate) (pmtb), piperazine (ppz), 5,5'-((5'-(4-((3,5-dicarboxyphenyl)ethynyl)phenyl)-[1,1':3',1''-terphenyl]-4, 4''-diyl)-bis(ethyne-2,1-diyl))diisophthalate (ptei), pyrene-2, 7-dicarboxylate (pydc), 5-methyl-4-oxo-1,4-dihydropyridine-3-carbaldehyde (pyen), 2-pyrimidinecarboxylate (pymc), pyrimidinolate (pymo), pyrene-2,7-dicarboxylate (pyrdc), quaterphenyl-3,3''',5,5'''-tetracarboxylate (qptc), trans-stilbene-3,3',5,5'-tetracarboxylate (sb(c), 5-sulfoisophthalate (sip), 4,4',4''-s-triazine-2,4, 6-tryltribenzoate (tatb), 4-(1H-tetrazole-5-yl)benzoate (4-tba), 5-tert-butyl-1,3-benzenedicarboxylate (tbbdc), 5-t-butyl isophthalate (tbip), 5,5',5''-(2,4,6-trimethylbenzene-1, 3,5-triyl)tris(ethyne-2,1-diyl)triisophthalate (tbtt), tris(4-carboxybiphenyl)amine (tcbpa), tetrakis[4-(carboxyphenyl)-oxamethyl]methane (tcm), 1,2,4,5-tetrakis (4-carboxyphenyl)-benzene (tcpb), N,N,N',N'-tetrakis(4-carboxyphenyl)biphenyl-4,4'-diamine (tcpbda), tetrafluoroterephthalate (tftpa), 3,3',5,5'-tetra(4-carboxyphenyl)-2,2'-diethoxylbiphenyl (tcpdep), N,N,N',N'-tetrakis(4-carboxyphenyl)-1,4-phenylenediamine (tcppda), thieno[3,2-b]thiophene-2,5-dicarboxylate (T2DC), triethylenediamine (ted), tetrafluoroterephthalate (tfbdc), tetramethylterephthalate (tmbdc), 1,3,5-tri-p-(tetrazol-5-yl)phenylbenzene (TPB-3tz), 2,4,6-tri-p-(tetrazol-5-yl)phenyl-s-triazine (TPT-3tz), 2,4,6-tri(3-pyridyl)-1,3,5-triazine (3-tpt), 2,4,6-tri(4-pyridyl)-1,3,5-triazine (4-tpt), terphenyl-3,3'',5,5''-tetracarboxylate (tptc), 5,10,15,20,-tetra-4-pyridyl-21H,23H-porphyrine (TPyP), 1,2,4-triazolate (trz), 5,5',5''-(((benzene-1, 3,5-trilytris(ethyne-2,1-diyl))tis(benzene-4,1-diyl))tris-(ethyne-2,1-diyl))trisophthalate (ttei), tetrakis(4-tetrazolylphenyl)methane (ttpm), 3,5-bis(trifluoromethyl)-1, 2,4-triazolate (Tz), tetrazolate-5-carboxylate (Tzc), TZI 5-tetrazolylisophthalate, ViPy 4-vinylpyridine, 2,3-Dimethyl-1,3-butadiene (DMBD).

The organic linkers may comprise one or more from the group consisting of 9,10-anthracenedicarboxylic acid, biphenyl-3,3',5,5'-tetracarboxylic acid, biphenyl-3,4',5-tricarboxylic acid, 5-bromoisophthalic acid, 5-cyano-1,3-benzenedicarboxylic acid, 2,2'-diamino-4,4'-stilbenedicarboxylic acid, 2,5-diaminoterephthalic acid, 2,2'-dinitro-4,4'-stilbenedicarboxylic acid, 5-ethynyl-1,3-benzenedicarboxylic acid, 2-hydroxyterephthalic acid, 3,3', 5,5'-azobenzene tetracarboxylic acid, [1,1'-biphenyl]-4,4'-dicarboxylic acid, 2,5-dihydroxyterephthalic acid, 2,6-naphthalenedicarboxylic acid, 1,4-phenylenediacetic acid, 1,1,2,2-tetra(4-carboxylphenyl)ethylene, 1,3,5-tricarboxybenzene, 1,3,5-tris(4-carboxyphenyl)benzene, 1,4-di(4'-pyrazolyl)benzene, 1,4,7,10-teraazaacyclododecane-N,N', N'',N'''-tetraacetic acid, 2,4,6-(tri-4-pyridinyl)-1,3,5-triazine, tris(isobutylaminoethyl)amine, 2-(diphenylphosphino)terephthalic acid.

MOFs suitable for use in the present invention include those operable to be used in water treatment, molecule separation, biofiltration and related applications. Suitable MOFs preferably have water and chemical stability. The MOFs may have water insoluble linkers, and/or solvent-stable linkers, and/or strong covalent bonds between SBU and linkers, and/or multi-covalent bonds between SBU and linkers. Water and chemical stability may mean that the MOFs do not fully disassemble to linkers and SBUs in the presence of water and/or chemicals. Suitable MOFs may have covalent bond links between the linkers and the SBUs or nodes, and/or coordinate bonding between the linkers and the SBUs or nodes.

Suitable MOFs may have high surface area and/or large pore sizes. The MOF may have surface area of at least 10 m²/g, such as 100 m²/g to 9,000 m²/g, preferably 100 m²/g to 8,000 m²/g or 500 m²/g to 8,000 m²/g. The surface area can be measured using the known Brunauer, Emmett and Teller (BET) technique. The MOFs according to any aspect of the present invention, suitably in the form of porous flakes or particles, may have an average pore size of from 0.1 nm to 1000 nm, 0.1 nm to 950 nm, 0.2 nm to 900 nm, 0.2 nm to 850 nm, preferably 0.2 nm to 800 nm, 0.3 nm to 700 nm, preferably 0.4 nm to 650 nm, 0.4 nm to 550 nm, 0.5 nm to 500 nm, 0.5 nm to 450 nm, 0.2 nm to 100 nm, such as between 0.2 to 90 nm, 0.3 nm to 75 nm, 0.4 nm to 50 nm, for example 0.4 nm to 40 nm, 0.4 nm to 30 nm, or 0.4 nm to 20 nm, suitably 0.4 nm to 15 nm, 0.4 nm to 10 nm.

The MOF may comprise a pillared-layer MOF. Suitably, in a pillared-layer MOF 2D sheets function as scaffolds for organic linkers, such as dipyridyl linkers. Advantageously, this can allow for diverse functionalities to be incorporated into the MOF, such as $—SO_3^{2-}$ groups. The use of $—SO_3^{2-}$_groups can induce a polarized environment and strong acid-base interaction with acidic guests like CO2. Furthermore, different pillar linker groups, such as $—N=N—$ compared to $—CH=CH—$, provide different selectivity to $H_2O$ and methanol.

The MOF may comprise a functional group. The MOF may in particular be adapted for water treatment, molecule separation and biofiltration related applications by the MOF comprising a functional group, suitably on one or more of the organic linkers. Said functional groups may provide selectivity and/or increase pore sizes for high adsorption capacity or high flux rate. The functional group may be selected from one or more of the group consisting of —NH$_2$, —Br, —Cl, —I, —(CH$_2$)$_n$—CH$_3$ wherein n is 1 to 10, such as CH$_3$CH$_2$CH$_2$O—, CH$_3$CH$_2$CH$_2$CH$_2$O—, ben-C$_4$H$_4$, methyl, —COOH, —OH. For example, the MOF may be an IRMOF, such as IRMOF-1, IRMOF-2, IRMOF-3, IRMOF-4, IRMOF-5, IRMOF-6, IRMOF-7, IRMOF-8, IRMOF-9, IRMOF-10, IRMOF-16, IRMOF-11, IRMOF-12, IRMOF-13, IRMOF-14, IRMOF-15; and/or a CAU, such as CAU-10-OH, CAU-10-NH$_2$, CAU-10-H, CAU-10-CH$_3$; and/or MIL-125-NH2; and/or UiO-66(ZrHCH3)2.

The MOF may be selected from one or more of Zr-DUT-51, Hf-DUT-51, PCN-777, NU-1105, DUT-52, DUT-53, DUT-84, DUT-67, DUT-68, DUT-69, DUT-6, such as MIL-125 (Fe, Cr, Al, V), MIL-53 (Fe, Cr, Al, V), MIL-47(Fe, Cr, Al, V), UAM-150, UAM-151, UAM-152, Zr(03PC12H8PO3), Zr Bipyridylphosphonates, Zr Methylphosphonates, Sn(IV) Bipyridylphosphonates, Sn(IV) Methylphosphonates, [Ag(4-biphenylsulfonate)]$^\infty$, [Ag(2-naphthalenesulfonate)]$^\infty$, [Ag(H2O)0.5(1-naphthalenesulfonate)]$^\infty$, [Ag(1-naphthalenesulfonate)]$^\infty$ and [Ag(1-pyrenesulfonate)]$^\infty$, UO$_2$(O$_3$PC$_6$H$_5$)$_3$0.7H$_2$O, (UO$_2$)$_3$(HOPC$_6$H$_5$)$_2$— (O$_3$PC$_6$H$_5$)$_3$3H$_2$O, SAT-16, SAT-12 (Mn$^{2+}$, Fe$^{2+}$, Co$^{2+}$, Ni$^{2+}$), MIL-91 (Al$^{3+}$, Fe$^{3+}$, In$^{3+}$, V$^{3+}$), STA-13 (Y$^{3+}$, Sc$^{3+}$, Yb$^{3+}$, Dy$^{3+}$), VSN-3 (with —CH$_2$— units ranging from 1 to 10), VSB-4 (with —CH$_2$— units ranging from 1 to 10), ZIF-95, ZIF-100, Ma(btp)$_2$ (M=Ni,Cu, Zn, and Co; H3btp=1,3,5-tris(1H-pyrazol-4-yl)benzene), IRMOF-76, IRMOF-77, PCM-18, MOF-1040, MOF-253_0.08PdCl$_2$, MOF-253_0.83PdCl$_2$, MOF-253_0.97Cu(BF$_4$)$_2$, NOTT-115, UMCM-150, UMCM-154, MOF-5, FJI-1, MOF-100, MOF-177, MOF-210, UMCM-1, UMCM-2, UMCM-3, UMCM-4, UMCM-8, UMCM-9, MTV-MOF-5, L6-L11; PCN-80, UNLPF-1, NOTT-140, UTSA-34a, UTSA-34b, MODF-1, SDU-1, NPG-5, UTSA-20, NU-100, NU-110E, PCN-61, PCN-66, PCN-69, PCN-610, DUT-49, PCN-88, NOTT-300, NOTT-202, NOTT-104, PCN-46, PCN-14, NOTT-100, NOTT-101, NOTT-103, NOTT-109, NOTT-111, ZSA-1, ZSA-2, NOTT-12, NOTT-16, POMF-Cu ([Cu$_{24}$L$_8$(H$_2$O)$_{24}$], MIL-59, PCN-12, PCN-12', DUT-75, DUT-76, PCN-16, PCN-16', PCN-511, IMP-11, PCN-512, IMP-9, MOF-11, MOF-36, Hf-PCN-523, PCN-521, MOF-177, MOF-180, MOF-200, SNU-150, MOF-14, MOF-143, MOF-388, MOF-399, UiO-88, MOF-1001, IRMOF-62, MOF-101, IRMOF-74, CAU-10-OH, CAU-10-NH$_2$, CAU-10-H, CAU-10-CH$_3$, CAU-10, CALF-25, Zn-DMOF, Co-DMOF, DUT-4, SAPO-34, SBA-15, HZSM-5, MCM-41, KIT-1, MCM-48, Zn-MOF-74, Ni-MOF-74, Mg-MOF-74, PCN-228, PCN-229, PCN-230, =MOF-808, MIL-160, MIL-163, FJI-H6, [Zr604(OH)4(btba)3](DMF)x(H2O)y wherein x is 0 to <20 and y is 0 to <20, FJI-H7, lanthanide element-based [La(pyzdc)1.5(H2O)2]2H2O, [Dy(Cmdcp)(H2O)3](NO3)2H2O)n, [Eu(HL)(H2O)2]n2H2O, Tb-DSOA, [Tb(L)(OH)]x(slov), ([Tb(L1)1.5(H2O)]3H2O, In-based JLU-Liu18, Al-based MIL-121, MAF-6, MAF-7, MAF-49, MAF-X8, [Zn12(trz)2O][SiW12040]11H2O, Zn2TCS(4'4-bipy), Zn-pbdo-11a(bpe)/-12a(bpey-12a(bpy), Zn(IM)1.5(ablM)0.5, ([Zn(C10H2O8)0.5(C10S2N2H8)] 5H2O))n, Co/Zn-BTTBBPY, PCN-601, Mg—CUK-1, [Cd2 (TBA)2(bipy)(DMA)2], Cu6(trz)10(H2O)4 [H2SiW12040}8H2O, [Ni(BPEB)], [Eu3(bpydb)3(HCOO) (u3-OH)2(DMF)](DMF)3(H2O)2, MAF-X25, MAF-X27, MAF-X25ox, MAF-27ox, PCN-101, NH2-MIL-125(Ti), Cu(I)-MOF, AEMOF-1, PCN-222, Cd-EDDA, [Cd2L2] NMPMEOH, Eu/UiO-66-(COOH)2, Eu/CPM-17-Zn, Eu/MIL-53-COOH(Al), [Ln(HL)(H2O)2]n2H2O, Eu3+

@MIL-124, ([Tb(L1)1.5(H2O)]3H2O)n, [Tb(IXOH)]x (solv), bio-MOF-1, BFMOF-1, NENU-500, Co-ZIF-9, Al2 (OH)2TCPP-Co, Al-MIL-101-NH-Gly-Pro, UiO-66-CAT, Pt/UiO-66, HPW@MIL-101, POM-ionic-liquid-functionalized MIL-100, sulphated MIL-53, MIL-101(Cr)—NO2, NENU-1/12-tungstosilicicacid, Na-HPAA, PCMOF-10, Ca-PiPhtA, (NH4)2(adp)[Zn2(ox)3]3H2O, ([Zn(C10H2O8)0.5 (C10S2N2H8)]5H2O])n, ([(Me2NH2]3(SO4))2[Zn2(ox)3]) n, UiO-66-(SO3H)2, Tb-DSOA, [La3L4(H2O)6]ClxH2O, CALF-25, (Cu2I2)[Cu2PDC2-(H2O)2]2[Cu(MeCN)4] IDMF, (Cu4I4)[Cu2PDC2-(H2O)2]4DMF, (Cu2I2) (Cu3PDC3-(H2O)2]2MeCN)2DMF, ZIF-1, ZIF-3, ZIF-4, ZIF-6, ZIF-10, ZIF-11, ZIF-12, ZIF-14, ZIF-20, ZIF-22, ZIF-9-67, ZIF-60, ZIF-67, ZIF-68, ZIF-69, ZIF-74, ZIF-76, ZIF-77, ZIF-78, ZIF-79, ZIF-80, ZIF-81, ZIF-82, ZIF-90, ZIF-95, ZIF-100, UiO-68, MOF-801, MOF-841, [Co4L3 (u3-OH)(H2O)3](SO4)0.5, MOF-802, Cu-BTTri, PCN-426, MOF-545, Zn(1,3-BDP), [(CH3)2NH2]2[Eu6(u3-OH)8(1, 4-NCD)6(H2O)6], NIDOBDC, Al(OH)(2,6-ndc) (ndc is naphthalendicarboxylate), MOF-525, MOF-535, Co-MOF-74, [Zn4(u4-O)-(u4-4-carboxy-3,5-dimethyl-4-carboxy-pyrazolato)3], PCP-33, NU-100, IRMOF-74-III-CH2NH2, Zn-pbdo-12a(bpe), mmen-Mg2(dobpdc), MAF-X25ox, FMOF-1, MAF-6, UiO-66-NH2@MON, ZIF-8, CAU-1, ZIF-67, MIL-68, MIL-101, UiO-67, UiO-66, [(C2H5) 2NH2]2[Mn6(L)(OH)2(H2O)6]4DEF, [Zn(trz)(H2betc)0.5] DMF, PCN-100, NU-1000, FIR-53, FIR-54,Al-MIL-96, Fe-MIL-100, Al-MIL-100, Cr-MIL-100, Fe-MIL-53, Cr-MIL-53, UiO-66-NH2, InPCF-1, HKUST-1, ZIF-7, ZIF-9, CAU-6, H-ZIF-8-11, H-ZIF-8-12, H-ZIF-8-14, ZIF-8-MeOH, AI-MIL-53, Cr-MIL-101, Cu2L, PED-MIL-101, HM-MIL-101, MOF-235, UiO-67-OH, ZIF-25, ZIF-71, ZIF-93, ZIF-96, ZIF-97.

The MOF may be selected from one or more of Co-MOF-74, [Zn4(u4-O)-(u4-4-carboxy-3,5-dimethyl-4-carboxy-pyrazolato)3], PCP-33, NU-100, IRMOF-74-III-CH2NH2, Zn-pbdc-12a(bpe), mmen-Mg2(dobpdc), MAF-X25ox, FMOF-1, MAF-6, UiO-66-NH2@MON, ZIF-8, CAU-1, ZIF-67, MIL-68, MIL-101, UiO-67, UiO-66, [(C2H5) 2NH2]2[Mn6(L)(OH)2(H2O)6]4DEF, [Zn(trz)(H2betc)0.5] DMF, PCN-100, NU-1000, FIR-53, FIR-54,Al-MIL-96, Fe-MIL-100, Al-MIL-100, Cr-MIL-100, Fe-MIL-53, Cr-MIL-53, UiO-66-NH2, InPCF-1, HKUST-1, ZIF-7, ZIF-9, CAU-6, H-ZIF-8-11, H-ZIF-8-12, H-ZIF-8-14, ZIF-8-MeOH, AI-MIL-53, Cr-MIL-101, Cu2L, PED-MIL-101, HM-MIL-101, MOF-235, UiO-67-OH, ZIF-25, ZIF-71, ZIF-93, ZIF-96, ZIF-97, for example one or more of ZIF-25, ZIF-71, ZIF-93, ZIF-96, ZIF-97, preferably for desalination membranes.

Suitably, the MOF is selected from one or more of Zr-DUT-51, Hf-DUT-51, PCN-777, NU-1105, DUT-52, DUT-53, DUT-84, DUT-67, DUT-68, DUT-69, DUT-6, such as MIL-125 (Fe, Cr, Al, V), MIL-53 (Fe, Cr, Al, V), MIL-47(Fe, Cr, Al, V), UAM-150, UAM-151, UAM-152, Zr(O3PC12H8PO3), Zr Bipyridylphosphonates, Zr Methylphosphonates, Sn(IV) Bipyridylphosphonates, Sn(IV) Methylphosphonates, [Ag(4-biphenylsulfonate)]$^\infty$, [Ag(2-naphthalenesulfonate)]$^\infty$, [Ag(H2O)0.5(1-naphthalenesulfonate)]$^\infty$, [Ag(1-naphthalenesulfonate)]$^\infty$ and [Ag(1-pyrenesulfonate)]$^\infty$, UO$_2$(O$_3$PC$_6$H$_5$)$_3$0.7H$_2$O, (UO$_2$)$_3$ (HOPC$_6$H$_5$)$_2$— (O$_3$PC$_6$H)$_3$H$_2$O, SAT-16, SAT-12 (Mn$^{2+}$, Fe$^{2+}$, Co$^{2+}$, Ni$^{2+}$), MIL-91 (Al$^{3+}$, Fe$^{3+}$, In$^{3+}$, V$^{3+}$), STA-13 (Y$^{3+}$, Sc$^{3+}$, Yb$^{3+}$, Dy$^{3+}$), VSN-3 (with —CH$_2$— units ranging from 1 to 10), VSB-4 (with —CH$_2$— units ranging from 1 to 10), ZIF-95, ZIF-100, Ma(btp)$_2$ (M=Ni,Cu, Zn, and Co; H3btp=1,3,5-tris(1H-pyrazol-4-yl)benzene), IRMOF-76, IRMOF-77, PCM-18, MOF-1040, MOF-253_0.08PdCl$_2$, MOF-253_0.83PdCl$_2$, MOF-253_0.97Cu(BF$_4$)$_2$, NOTT-115, UMCM-150, UMCM-154, MOF-5, FJI-1, MOF-100, MOF-177, MOF-210, UMCM-1, UMCM-2, UMCM-3, UMCM-4, UMCM-8, UMCM-9, MTV-MOF-5, L6-L11; PCN-80, UNLPF-1, NOTT-140, UTSA-34a, UTSA-34b, MODF-1, SDU-1, NPG-5, UTSA-20, NU-100, NU-110E, PCN-61, PCN-66, PCN-69, PCN-610, DUT-49, PCN-88, NOTT-300, NOTT-202, NOTT-104, PCN-46, PCN-14, NOTT-100, NOTT-101, NOTT-103, NOTT-109, NOTT-11, ZSA-1, ZSA-2, NOTT-12, NOTT-16, POMF-Cu ([Cu$_{24}$La (H$_2$O)$_{24}$], MIL-59, PCN-12, PCN-12', DUT-75, DUT-76, PCN-16, PCN-16', PCN-511, IMP-11, PCN-512, IMP-9, MOF-11, MOF-36, Hf-PCN-523, PCN-521, MOF-177, MOF-180, MOF-200, SNU-150, MOF-14, MOF-143, MOF-388, MOF-399, UiO-88, MOF-1001, IRMOF-62, MOF-101, IRMOF-74, CAU-10-OH, CAU-10-NH$_2$, CAU-10-H, CAU-10-CHa, CAU-10, CALF-25, Zn-DMOF, Co-DMOF, DUT-4, SAPO-34, SBA-15, HZSM-5, MCM-41, KIT-1, MCM-48, Zn-MOF-74, Ni-MOF-74, Mg-MOF-74, PCN-228, PCN-229, PCN-230, MOF-808, MIL-160, MIL-163, FJI-H6, [Zr6O4(OH)4(btba)3](DMF)x(H2O)y, wherein x is 0 to <20 and y is 0 to <20, FJI-H7, lanthanide element-based [La(pyzdc)1.5(H2O)2]2H2O, [Dy (CmdcpxH2O)3](NO3)2H2O)n, [Eu(HL)(H2O)2]n2H2O, Tb-DSOA, [Tb(L)(OH)]x(slov), ([Tb(L1)1.5(H2O)]3H2O, In-based JLU-Liu18, Al-based MIL-121, MAF-6, MAF-7, MAF-49, MAF-X8, [Zn12(trz)20][SiW12O40]11H2O, Zn2TCS(4'4-bipy), Zn-pbdo-11a(bpe)/-12a(bpey-12a(bpy), Zn(IM)1.5(ablM)0.5, ([Zn(C10H2O8)0.5(C10S2N2H8)] 5H2O))n, Co/Zn-BTTBBPY, PCN-601, Mg—CUK-1, [Cd2 (TBA)2(bipy)(DMA)2], Cu6(trz)10(H2O)4 [H2SiW12O40}8H2O, [Ni(BPEB)], [Eu3(bpydb)3(HCOO) (u3-OH)2(DMF)](DMF)3(H2O)2, MAF-X25, MAF-X27, MAF-X25ox, MAF-27ox, PCN-101, NH2-MIL-125(Ti), Cu(I)-MOF, AEMOF-1, PCN-222, Cd-EDDA, [Cd2L2] NMPMEOH, Eu/UiO-66-(COOH)2, Eu/CPM-17-Zn, Eu/MIL-53-COOH(Al), [Ln(HL)(H2O)2]n2H2O, Eu3+ @MIL-124, ([Tb(L1)1.5(H2O)]3H2O)n, [Tb(IXOH)]x (solv), bio-MOF-1, BFMOF-1, NENU-500, Co-ZIF-9, Al2 (OH)2TCPP-Co, Al-MIL-101-NH-Gly-Pro, UiO-66-CAT, Pt/UiO-66, HPW@MIL-101, POM-ionic-liquid-functionalized MIL-100, sulphated MIL-53, MIL-101(Cr)—NO2, NENU-1/12-tungstosilicicacid, Na-HPAA, PCMOF-10, Ca-PiPhtA, (NH4)2(adp)[Zn2(ox)3]3H2O, ([Zn(C10H2O8)0.5 (C10S2N2H8)]5H2O)]n, ([(Me2NH2]3(SO4))2[Zn2(ox)3]) n, UiO-66-(SO3H)2, Tb-DSOA, [La3L4(H2O)6]Cl)(H2O, CALF-25, (Cu2I2)[Cu2PDC2-(H2O)2]2[Cu(MeCN)4] IDMF, (Cu4I4)[Cu2PDC2-(H2O)2]4DMF, (Cu2I2) (Cu3PDC3-(H2O)2]2MeCN)2DMF, ZIF-1, ZIF-3, ZIF-4, ZIF-6, ZIF-10, ZIF-11, ZIF-12, ZIF-14, ZIF-20, ZIF-22, ZIF-9-67, ZIF-60, ZIF-67, ZIF-68, ZIF-69, ZIF-74, ZIF-76, ZIF-77, ZIF-78, ZIF-79, ZIF-80, ZIF-81, ZIF-82, ZIF-90, ZIF-95, ZIF-100, UiO-68, MOF-801, MOF-841, [Co4L3 (u3-OH)(H2O)3](SO4)0.5, MOF-802, Cu-BTTri, PCN-426, MOF-545, Zn(1,3-BDP), [(CH3)2NH2]2[Eu6(u3-OH)8(1, 4-NCD)6(H2O)6], NIDOBDC, Al(OH)(2,6-ndc) (ndc is naphthalendicarboxylate), MOF-525, MOF-535.

The MOF may be selected from one or more of zeolitic imidazolate frameworks (ZIFs), suitably a ZIF formed from a metal salt of Zn, Co, Cd, Li, or B, with an imidazole based linker, such as ZIF-1, ZIF-3, ZIF-4, ZIF-6, ZIF-10, ZIF-11, ZIF-12, ZIF-14, ZIF-20, ZIF-22, ZIF-9-67, ZIF-60, ZIF-67, ZIF-68, ZIF-69, ZIF-74, ZIF-76, ZIF-77, ZIF-78, ZIF-79, ZIF-80, ZIF-81, ZIF-82, ZIF-90, ZIF-95, ZIF-100, ZIF-9, H-ZIF-8-11, H-ZIF-8-12, H-ZIF-8-14, ZIF-8-MeOH, ZIF-25, ZIF-71, ZIF-93, ZIF-96, ZIF-97 and their derivatives. The MOF may be selected from one or more of ZIF-1, ZIF-3, ZIF-4, ZIF-6, ZIF-10, ZIF-11, ZIF-12, ZIF-14, ZIF-20, ZIF-22, ZIF-9-67, ZIF-60, ZIF-67, ZIF-68, ZIF-69, ZIF-74, ZIF-76, ZIF-77, ZIF-78, ZIF-79, ZIF-80, ZIF-81, ZIF-82, ZIF-90, ZIF-95, ZIF-100.

Advantageously, ZIFs have been found to provide robust chemical and thermal resistance and controllable porosity and pore sizes.

The ZIFs may be formed of repeating units of (M-Im-M), wherein M is Zn or Co, and Im is imidazole or a derivative thereof which bridges the metal units in a tetrahedral coordination.

The imidazole or its derivative unit may be selected from one or more of imidazole (ZIF-4 linker), 2-methylimidazole (ZIF 8 linker), 2-ethyl imidazole, 2-nitro imidazole, 4-isocyanoimidazole, 4,5-dichloroimidazole, imidazole-2-carbaldehyde, imidazo[4,5-b]pyridine, benzo[d]imidazole, 6-chloro-benzo[d]imidazole, 5,6-dimethyl-benzo[d]imidazole, 6-methyl-benzo[d]imidazole, 6-bromo-benzo[d]imidazole, 6-nitro-benzo[d]imidazole, imidazo[4,5-c]pyridine, purine.

Advantageously, ZIFs can be used for high temperature filtration application and provide high thermal stability, high strength and/or chemical resistance. For example, ZIF 8 can withstand temperatures of up to 550° C.

The MOF may be selected from one or more UiO MOFs, such as UiO-66, for example Eu/UiO-66-(COOH)2, UiO-66-CAT, Pt/UiO-66, UiO-66-(SO3H)2, UiO-67, UiO-68, UiO-88 and their derivatives. For example, the UIO-66 MOF may be Eu/UiO-66-(COOH)2, UiO-66-CAT, Pt/UiO-66, UiO-66-(SO3H)2. The MOF may comprise UiO-68 or UiO-88.

Advantageously, UiO MOFs have been found to provide robust properties, such as high chemical and thermal stability, high mechanical strength, and/or large surface area. For instance, the thermal stability temperature is at least 200° C. UiO MOFs are Zr based. The UiO MOF may be zirconium 1,4-dicarboxybenzne MOF (UiO 66) which may be comprised of Zr6O4(OH)4, octahedral, 12-fold connected to adjacent octahedra through a 1,4-benzene-dicarboxylate (BDC) linker. The UiO MOF may alternatively/additionally be selected from one or more of UiO 66, zirconium aminobenzenedicarboxylate MOF (UiO-66-BDC-NH2), zirconium benzenedicarboylate (UiO-66-BDC), zirconium biphenyidicarboxylate MOF (UiO-66-BPD/UiO-67), zirconium fumarate MOF (UiO-66-FA, FA:Zr=0.66-0.98), zirconium trans-1,2-ethylenedicarboxylic acid MOF (UiO-66-FA, FA:Zr=1), zirconium trimellitate MOF (UiO-66-BDC-COOH, BDC-COOH:Zr=0.9-1.0).

The MOF may be selected from one or more of MOF-74, such as Zn-MOF-74, Ni-MOF-74, Mg-MOF-74.

The MOF may be selected from one or more of Cu-BTTri, MIL-53 (Al), MIL-101(Cr), PCN-426-Cr(III), [(CH3) 2NH2]2[Eu6(u3-OH)8(1,4-NCD)6(H2O)6], Zn(1,3-BDP), MOF-808, DUT-69, DUT-67, DUT-68, PCN-230, PCN-222, MOF-545, MOF-802, and HKUST-1. Suitably, the MOF is selected from one or more of MOF-808, PCN-230, PCN-222 and HKUST-1, preferably one or more of MOF-808, PCN-230, PCN-222.

The active layer may be operable to provide size exclusion filtration, fouling resistance, and/or adsorption, such as size exclusion and fouling resistance.

The pore size of the MOF may be tailored by using different species of MOFs or different organic linkers with different lengths. For example, the pore size of the MOF may be at least 0.6 nm (e.g. ZIF-78), such as at least 0.8 nm (e.g. ZIF-81), or at least 0.9 nm (e.g. ZIF-79) or at least 1.2 nm (e.g. ZIF-69), or at least 1.3 nm (e.g. ZIF-68) or at least 1.6 nm (e.g. ZIF-82), such as at least 1.8 nm (e.g. ZIF-70), or at least 1.8 nm (e.g. IRMOF-10), or at least 2.8 nm (e.g. MOF-177).

The MOF may comprise MOF-74 adapted by replacing one or more of the original linkers containing one phenyl ring with a linker containing two, three, four, five, six, seven, nine, ten or eleven phenyl rings. Such an adaption can alter the pore size from ~1.4 nm to ~2.0 nm, to ~2.6 nm, to ~3.3 nm, to ~4.2 nm, to ~4.8 nm, to ~5.7 nm, to ~7.2 nm, to ~9.5 nm, respectively.

The MOF may be hydrophobic. The hydrophobic MOF may be selected from one or more of MIL-101(Cr), NIDOBDC, HKUST-1, Al(OH)(2,6-ndc) (ndc is naphthalendicarboxylate), MIL-100-Fe, UiO-66, ZIF family, such as ZIF 71, ZIF 74, ZIF-1, ZIF-4, ZIF-6, ZIF-11, ZIF-9, and ZIF 8. Advantageously, the use of such MOFs can improve the fouling resistance of the membrane.

The MOF may comprise an adsorption promoting MOF, for example UiO-66 or UiO-66-NH2, preferably UiO-66-NH2, which has been found to adsorb cationic dyes from aqueous solution more effectively than anionic dyes due to favourable electrostatic interactions between the adsorbents and cationic dyes. In particular, UiO-66-NH2 has been found to provide much higher adsorption capacity for cationic dyes and lower adsorption capacity for anionic dyes than UiO-66.

The active layer of any aspect of the present invention may have a thickness of from 2 nm to 1000 nm, such as from 3 nm to 800 nm or from 4 nm to 600 nm, such as 5 nm to 400 nm or 5 to 200 nm, preferably 5 nm to 150 nm or 5 nm to 100 nm.

The MOFs according to any aspect of the present invention may comprise nanochannels, suitably the MOFs are in the form of flakes or particles comprising nanochannels. The average nanochannel diameter may be from 0.2 nm to 100 nm, such as between 0.2 nm to 90 nm, 0.3 nm to 75 nm, 0.4 nm to 50 nm, for example 0.5 nm to 40 nm, 0.5 nm to 30 nm, or 0.5 nm to 20 nm, suitably 0.5 nm to 15 nm, 0.5 nm to 10 nm or preferably 0.5 nm to 8 nm.

The MOF may be a zirconium based MOF, such as UiO-66 (Zr), UiO-67 (Zr), and UIO-68 (Zr), MOF-525 (Zr6O4(OH)4(TCPP-H2)3, MOF-535 (Zr6O4(OH)4(XF)3, and MOF 545 (Zr6O8(H2O)8(TCPP-H2)2, where porphyrin H4-TCPP-H2=(C48H24O8N4) and cruciform H4-XF= (C42O8H22), preferably UIO-68 (Zr) or MOF-525, most preferably UiO-68. Said MOFs have been found to show exceptional stability against chemicals, temperature and mechanical stress. The structure of said MOFs may comprise Zr6O4(OH)4 cluster subunits as nodes and organic linkers such as benzene 1,4-dicarboxylate liner.

The MOF may comprise functional groups selected from one or more of amine, aldehyde, alkynes, and/or azide. MOFs pores may be modified for selective sieving and to provide higher efficiency by modification methods, suitably post-synthetic, on the linkers and/or the secondary building units/nodes, such as covalent post-synthetic modification method of amine, or aldehyde, or alkynes, or azides functional groups. Specific functional groups may be induced to MOF(s) for specific application. For example, adding —NH2 to UiO-66 to make UiO-66-NH2 has been found to improve ferric acid adsorption, and adding sulfone bearing groups to iso IRMOF-16 by, for example, oxidation using dimethyldioxirane, in order to create compatible interaction between the active layer and substrate.

The MOFs of the present invention may be synthesised according to the required property or purchased from commercial supplier. Suitable commercially available metal-organic framework materials can be purchased from BASF, Sigma-Aldrich, or Strem Chemicals.

The methods used to synthesise MOFs for the current invention are those conventional in the art and may be solvothermal synthesis, microwave-assisted synthesis, electrochemical synthesis etc.

The MOF may be synthesised from precursor material in the presence of a substrate.

A modulator may be used during synthesis of the MOF to control the MOF particle size, the modulator may be benzoic acid.

Suitably, the MOF is synthesised without the presence of a substrate.

The MOF may be in the form of a crystallised continuous phase or particles or flakes compacted and interacting or fused to each other forming the active layer. Preferably the MOF is in the form of particles or flakes.

The size distribution of the MOF flakes or particles may be such that at least 30 wt % of the MOF flakes or particles have a size of between 1 nm to 10000 nm, such as between 2 nm to 7500 nm, 5 nm to 5000 nm, 10 nm to 4000 nm, for example 15 nm to 3500 nm, 20 nm to 3000 nm, or 25 nm to 3000 nm, suitably 30 nm to 2500 nm, 40 nm to 2500 nm or preferably 50 nm to 2500 nm more preferably at least 40 wt %, 50 wt %, 60 wt %, 70 wt % and most preferably at least 80 wt % or at least 90 wt % or 95 wt % or 98 wt % or 99 wt %. The size of the MOF and size distribution may be measured using transmission electron microscopy (TEM, JEM-2100F, JEOL Ltd. Japan).

For example, lateral sizes of two-dimensional layers across a sample of a MOF may be measured using transmission electron microscopy (TEM, JEM-2100F, JEOL Ltd. Japan), and the number ($N_i$) of the same sized nanosheets ($M_i$) measured. The average size may then be calculated by Equation 1:

$$\text{Average size} = \sum\nolimits_{i=1}^{\infty} N_i M_i \Big/ \sum\nolimits_{i=1}^{\infty} N_i$$

where $M_i$ is diameter of the nanosheets, and $N_i$ is the number of the size with diameter $M_i$.

The average size of the MOF particle or flake may be at least 60% of the average pore size of the substrate. For example, for average pore size of the substrate of 200 nm, the flake or particle may have an average size of at least 120 nm. Suitably, the average size of the MOF is equal to or larger than the average pore size of the porous substrate, such as at least 100%, or at least 120%, or at least 140% of the average pore size of the substrate.

The active layer may comprise materials, suitably two-dimensional materials, other than a MOF.

For example, other materials of the active layer may be selected from one or more of transition metal dichalcogenide, silicene, germanene, stanene, boron-nitride, suitably h-boron nitride, carbon nitride, transition metal dichalcogenide, graphene, graphene oxide, reduced graphene oxide functionalised graphene oxide and polymer/graphene aerogel.

The active layer may comprise additives to tailor the properties of the active layer, such as other metals; and/or fibres, such as metal oxide nanostrands; and/or dopants such as Au, Fe, Cu, $Cu(OH)_2$, $Cd(OH)_2$ and/or $Zr(OH)_2$. Such additives may be added to the membrane to control the pore sizes and channel architecture of MOF and/or create nanochannels for high water flux rate. Any type of suitable fibres, such as continuous or stapled fibres, having diameter of 0.1 nm to 1000 nm may be incorporated within the membrane. Such as 0.1 nm to 850 nm, 0.5 nm to 500 nm, or 0.5 nm to 100 nm, 0.75 nm to 75 nm, preferably, 0.75 nm to 50 nm. Suitably, the fibres are removed before use, such as by mechanical removal or by dissolution, etc.

Additives may be introduced to the coating composition containing the MOF and/or deposited on the membrane surface.

The membrane may comprise two or more discrete portions of active layers on the substrate.

The membrane of the present invention may be for any type of filtration. Suitably, the membrane of the present invention is for water treatment, such as oil/water separation; molecule separation, pharmaceutical filtration for removal of pharmaceutical residues in the aquatic environment; biofiltration, for example separation between microorganisms and water; desalination or selective ion filtration; and nuclear waste water filtration for removal of nuclear radioactive elements from nuclear waste water; for blood treatment such as physiological filtration to replace damaged kidney filter and blood filtration; and/or separation of bioplatform molecules derived from sources such as plants, for example a grass.

Suitably the membrane is for water treatment, such as desalination or oil and water separation, or for pharmaceutical filtration, or for dye removal.

The methods according to any aspect of the present invention may comprise contacting the coating composition onto the substrate using gravity deposition, vacuum deposition, pressure deposition; printing such as inkjet printing, aerosol printing, 3D printing, offset lithography printing, gravure printing, flexographic printing techniques, pad printing; curtain coating, dip coating, spin coating, and other printing or coating techniques known to those skilled in the art.

The method of applying the active layer coating composition to the filtration membrane layer may comprise the step of applying a coating composition comprising the MOF onto the support layer. The method may comprise contacting the coating composition onto the support layer using gravity deposition, vacuum deposition, pressure deposition; printing such as inkjet printing, aerosol printing, 3D printing, offset lithography printing, gravure printing, flexographic printing techniques, pad printing; curtain coating, dip coating, spin coating, and other printing or coating techniques known to those skilled in the art.

Further details of the application methods are disclosed in published PCT patent application WO2019/186134, specifically, paragraphs [117], [118] and [126] to [130] inclusive. The entire contents paragraphs [117], [118] and [126] to [130] inclusive thereof are fully incorporated herein by reference.

Suitably the coating composition is a liquid composition comprising a liquid medium and one or more of MOF(s). The coating compositions of the present invention may comprise solvent, non-solvent or be solvent-less, and may be UV curable compositions, e-beam curable compositions etc.

The coating composition may comprise MOF precursors, such as one or more of a SBU or node precursor, suitably in the form of a salt, and organic ligand or precursor thereof. The coating composition may comprise, or be formed from a salt precursor of any type of compound that could be used to synthesise a MOF SBU or node, such a metal salt, for example one or more of an aluminium salt, ammonium salt, antimony salt, arsenic salt, barium salt, beryllium salt, bismuth salt, cadmium salt, calcium salt, cerium salt, caesium salt, chromium salt, cobalt salt, copper salt, dysprosium salt, erbium salt, europium salt, gadolinium salt, gallium salt, germanium salt, gold salt, hafnium salt, holmium salt, indium salt, iridium salt, iron salt, lanthanum salt, lead salt, lithium salt, lutetium salt, magnesium salt, manganese salt, mercury salt, molybdenum salt, neodymium salt, nickel salt, niobium salt, osmium salt, palladium salt, platinum salt, potassium salt, praseodymium salt, rhenium salt, rhodium salt, rubidium salt, ruthenium salt, samarium salt, scandium salt, selenium salt, silver salt, sodium salt, strontium salt, sulfur salt, tantalum salt, tellurium salt, terbium salt, thallium salt, thorium salt, thulium salt, tin salt, titanium salt, tungsten salt, vanadium salt, ytterbium salt, yttrium salt, zinc salt, zirconium salt.

The organic ligand precursor may include any type of organic ligand that could be used to synthesise a MOF, such as any one of the organic linkers listed above.

The precursor may be further dispersed or diluted to a mixture of ethanol and ethylene glycol and optionally filtered through filter with 500 nm pore size.

The organic ligand precursor may include any type of organic ligand that could be used to synthesise a MOF, such as any one of the organic linkers listed above.

Further details of the active layer composition are disclosed in published PCT patent application WO2019/186134, specifically, paragraphs [97] to [116] inclusive. The entire contents paragraphs [97] to [116] inclusive thereof are fully incorporated herein by reference.

When formulated as a liquid composition for use in the invention, e.g. as a solution, dispersion or suspension, a suitable carrier liquid or solvent may be aqueous or organic, and other components will be chosen accordingly. Optionally with other materials to enhance performance and/or rheology of the composition including any one or more of binders, drying additives, antioxidants, reducing agents, lubricating agents, plasticisers, waxes, chelating agents, surfactants, pigments, defoamers and sensitisers. Preferably in the coating composition the MOF is dispersed or suspended in a carrier, suitably a carrier liquid.

The liquid carrier may be selected from one or more of water, ethanol, propanol, glycol, tertiary butanol, acetone, dimethyl sulfoxide, mixture of dimethyl sulfoxide/alcohol/glycol, water/alcohol/glycol, glycol/water/tertiary butanol, water/acetone mixtures, water/ethanol mixtures, N,N-dimethytformamide, N,N-diethylformamide, dimethylsulfoxide (DMSO), ethylene glycol (EG), N-methyl-2-pyrrolidone, isopropyl alcohol, mineral oil, dimethytformamide, terpineol, ethylene glycol, or mixtures thereof, preferably, water/ethanol, such as 50/50 vol % water/ethanol, water optionally with one or more stabiliser, such as lithium oxide; N-methyl-2-pyrrolidone (NMP), N,N-dimethylformamide, N,N-diethylformamide or terpineol, most preferably, water:ethanol, such as 50:50 vol % water/ethanol, N,N-dimethytformamide, N,N-diethylformamide.

Surfactants may be used with water or with other liquid as stabiliser and/or rheology modifier to stabilise the MOF dispersion and/or modify their viscosities, such as ionic surfactants, non-ionic surfactants and any other surfactants. Preferably, ionic surfactants are used as a stabiliser. The stabiliser may be selected from one or more of sodium cholate, sodium dodecyl sulphate, sodium dodecylbenzenesulphonate, lithium dodecyl sulphate, taurodeoxycholate, Triton X-100, TX-100, IGEPAL CO-890, etc. Preferably, Triton X-100.

Centrifuge may be used to remove aggregated MOF. The spinning speed (rpm) may be within 100 to 10,000, such as 500 to 9000, 750 to 8,000, 800 to 6000, preferably 1,000 to 6,000.

Filtration may be applied to remove aggregated MOF in the dispersion.

The active layer may further comprise nanochannels formed by the use of fibres in the production of the membrane. Advantageously, the presence of nanochannels within the active layers have been found to significantly increase the water flux by incorporating continuous or chopped fibres having diameter of 0.5 nm to 1000 nm during the manufacture process followed by removal of the fibres.

The nanochannels in the active layer may have a diameter of 1 nm to 750 nm, such as 1 nm to 500 nm, or 1 nm to 250 nm, for example 1 nm to 150 nm or 1 nm to 100 nm, for example 1 nm to 50 nm or 1 nm to 25 nm, such as 1 nm to 10 nm or preferably 1 nm to 5 nm.

The active layer of any aspect of the present invention may have a thickness of from 2 nm to 1000 nm, such as from 3 nm to 800 nm or from 4 nm to 600 nm, such as 5 nm to 400 nm or 5 nm to 200 nm, preferably 5 nm to 150 nm or 5 nm to 100 nm.

The support layer is operable to provide structural support to the active layer.

The support layer of the membrane envelope may have any suitable thickness. The thickness of the support layer may be between 5 μm to 200 μm, such as between 5 μm to 100 μm, or between 10 μm to 100 μm, or between 30 μm and 100 μm, preferably between 30 μm and 90 μm more preferably between 30 μm and 85 μm, such as between 30 μm and 70 μm, or between 30 μm and 60 μm.

Optionally, the support layer may have a thickness of between 5 μm and 30 μm, such as between 8 μm and 25 μm or between 8 μm and 20 μm, preferably between 10 μm and 15 μm, suitably said support layer is a poly(ether) sulfone support layer.

Advantageously, the spiral wound component of the present invention may provide high chemical, mechanical and/or thermal stability, good fouling resistance with cleanability, long life span, high permeability and/or controllable selectivity.

The carrier according to the aspects of the present invention may be utilised in a wide range of architectures and filtration devices, including but not limited to those working under gravity filtration, vacuum filtration and/or pressurised systems.

The carrier of any aspect of the present invention may be for any type of filtration. Suitably, the carrier of the present invention is for water treatment, such as oil/water separation; molecule separation, pharmaceutical filtration for removal of pharmaceutical residues in the aquatic environment; biofiltration, for example separation between microorganisms and water; desalination or selective ion filtration; and nuclear waste water filtration for removal of nuclear radioactive elements from nuclear waste water; for blood treatment such as physiological filtration to replace damaged kidney filter and blood filtration; and/or separation of bio-platform molecules derived from sources such as plants, for example a grass. Suitably the carrier is for water treatment, such as desalination or oil and water separation, or for pharmaceutical filtration.

The term "lattice" herein means a three-dimensional structure composing one or more repeating unit cells wherein the unit cells are interconnected such as to allow for fluid flow to adjacent unit cells. Triply period surfaces as included is part of the term "lattice".

The term "lamellar structure" herein means a structure having at least two overlapping layers. The term "active layer" or "filtration membrane layer" herein means a porous barrier operable to separate the desired dissolved materials (solutes), colloids or particulates from the feed solutions. It may represent the interface between the feed flow and the permeate flow. The term "two-dimensional material" herein means a material with at least one dimension of less than 100 nm.

The term "shelled" referred to herein, means hollowed solid parts of a structure with a given wall thickness.

The term "higher archival lattice structure" herein means a lattice structure containing structural elements which are built out of another lattice structure which can continue to be built out of subsequent lattice structure to an $n^{th}$ degree.

Turbulence is measured by the Reynolds number (Re):

$$Re = \frac{\rho u L}{\mu}$$

Wherein $\rho$ is the density of the fluid, $u$ is the flow speed, $L$ is the characteristic linear dimension, and $\mu$ is the dynamic viscosity of the fluid.

For the purpose of the present invention, an aliphatic group is a hydrocarbon moiety that may be straight chain (i.e. unbranched), branched, or cyclic and may be completely saturated, or contain one or more units of unsaturation, but which is not aromatic. The term "unsaturated" means a moiety that has one or more double and/or triple bonds. The term "aliphatic" is therefore intended to encompass alkyl, cycloalkyl, alkenyl cycloalkenyl, alkynyl or cycloalkenyl groups, and combinations thereof. The term "(hetero)aliphatic" encompasses both an aliphatic group and/or a heteroaliphatic group.

An aliphatic group is optionally a $C_{1-30}$ aliphatic group, that is, an aliphatic group with 1, 2, 3, 4, 5, 6, 7, 8, 9, 10, 11, 12, 13, 14, 15, 16, 17, 18, 19, 20, 21, 22, 23, 24, 25, 26, 27, 28, 29 or 30 carbon atoms. Optionally, an aliphatic group is a $C_{1-15}$ aliphatic, optionally a $C_{1-12}$ aliphatic, optionally a $C_{1-10}$ aliphatic, optionally a $C_{1-8}$ aliphatic, such as a $C_{1-6}$ aliphatic group. Suitable aliphatic groups include linear or branched, alkyl, alkenyl and alkynyl groups, and mixtures thereof such as (cycloalkyl)alkyl groups, (cycloalkenyl) alkyl groups and (cycloalkyl)alkenyl groups.

The term "alkyl," as used herein, refers to saturated, straight- or branched-chain hydrocarbon radicals derived by removal of a single hydrogen atom from an aliphatic moiety. An alkyl group is optionally a "$C_{1-20}$ alkyl group", that is an alkyl group that is a straight or branched chain with 1 to 20 carbons. The alkyl group therefore has 1, 2, 3, 4, 5, 6, 7, 8, 9, 10, 11, 12, 13, 14, 15, 16, 17, 18, 19 or 20 carbon atoms. Optionally, an alkyl group is a $C_{1-15}$ alkyl, optionally a $C_{1-12}$ alkyl, optionally a $C_{1-10}$ alkyl, optionally a $C_{1-8}$ alkyl, optionally a $C_{1-6}$ alkyl group. Specifically, examples of "$C_{1-20}$ alkyl group" include methyl group, ethyl group, n-propyl group, iso-propyl group, n-butyl group, iso-butyl group, sec-butyl group, tert-butyl group, sec-pentyl, iso-pentyl, n-pentyl group, neopentyl, n-hexyl group, sec-hexyl, n-heptyl group, n-octyl group, n-nonyl group, n-decyl group, n-undecyl group, n-dodecyl group, n-tridecyl group, n-tet-radecyl group, n-pentadecyl group, n-hexadecyl group, n-heptadecyl group, n-octadecyl group, n-nonadecyl group, n-eicosyl group, 1,1-dimethylpropyl group, 1,2-dimethyl-propyl group, 2,2-dimethylpropyl group, 1-ethylpropyl group, n-hexyl group, 1-ethyl-2-methylpropyl group, 1,1,2-trimethylpropyl group, 1-ethylbutyl group, 1-methylbutyl group, 2-methylbutyl group, 1,1-dimethylbutyl group, 1,2-dimethylbutyl group, 2,2-dimethylbutyl group, 1,3-dimethylbutyl group, 2,3-dimethylbutyl group, 2-ethylbutyl group, 2-methylpentyl group, 3-methylpentyl group and the like.

The term "alkenyl," as used herein, denotes a group derived from the removal of a single hydrogen atom from a straight- or branched-chain aliphatic moiety having at least one carbon-carbon double bond. The term "alkynyl," as used herein, refers to a group derived from the removal of a single hydrogen atom from a straight- or branched-chain aliphatic moiety having at least one carbon-carbon triple bond. Alkenyl and alkynyl groups are optionally "$C_{2-20}$alkenyl" and "$C_{2-20}$alkynyl", optionally "$C_{2-15}$ alkenyl" and "$C_{2-15}$ alkynyl", optionally "$C_{2-12}$ alkenyl" and "$C_{2-12}$ alkynyl", optionally "$C_{2-10}$ alkenyl" and "$C_{2-10}$ alkynyl", optionally "$C_{2-8}$alkenyl" and "$C_{2-8}$alkynyl", optionally "$C_{2-6}$alkenyl" and "$C_{2-6}$ alkynyl" groups, respectively. Examples of alkenyl groups include ethenyl, propenyl, allyl, 1,3-butadienyl, butenyl, 1-methyl-2-buten-1-yl, allyl, 1,3-butadienyl and allenyl. Examples of alkynyl groups include ethynyl, 2-propynyl (propargyl) and 1-propynyl.

The terms "cycloaliphatic", "carbocycle", or "carbocyclic" as used herein refer to a saturated or partially unsaturated cyclic aliphatic monocyclic or polycyclic (including fused, bridging and spiro-fused) ring system which has from 3 to 20 carbon atoms, that is an alicyclic group with 3, 4, 5, 6, 7, 8, 9, 10, 11, 12, 13, 14, 15, 16, 17, 18, 19 or 20 carbon atoms. Optionally, an alicyclic group has from 3 to 15, optionally from 3 to 12, optionally from 3 to 10, optionally from 3 to 8 carbon atoms, optionally from 3 to 6 carbons atoms. The terms "cycloaliphatic", "carbocycle" or "carbocyclic" also include aliphatic rings that are fused to one or more aromatic or nonaromatic rings, such as tetrahydronaphthyl rings, where the point of attachment is on the aliphatic ring. A carbocyclic group may be polycyclic, e.g. bicyclic or tricyclic. It will be appreciated that the alicyclic group may comprise an alicyclic ring bearing one or more linking or non-linking alkyl substituents, such as —CH₂-cyclohexyl. Specifically, examples of carbocycles include cyclopropane, cyclobutane, cyclopentane, cyclohexane, bicycle[2,2,1]heptane, norborene, phenyl, cyclohexene, naphthalene, spiro[4.5]decane, cycloheptane, adamantane and cyclooctane.

A heteroaliphatic group (including heteroalkyl, heteroalkenyl and heteroalkynyl) is an aliphatic group as described above, which additionally contains one or more heteroatoms. Heteroaliphatic groups therefore optionally contain from 2 to 21 atoms, optionally from 2 to 16 atoms, optionally from 2 to 13 atoms, optionally from 2 to 11 atoms, optionally from 2 to 9 atoms, optionally from 2 to 7 atoms, wherein at least one atom is a carbon atom. Optional heteroatoms are selected from O, S, N, P and Si. When heteroaliphatic groups have two or more heteroatoms, the heteroatoms may be the same or different. Heteroaliphatic groups may be substituted or unsubstituted, branched or unbranched, cyclic or acyclic, and include saturated, unsaturated or partially unsaturated groups.

An alicyclic group is a saturated or partially unsaturated cyclic aliphatic monocyclic or polycyclic (including fused, bridging and spiro-fused) ring system which has from 3 to 20 carbon atoms, that is an alicyclic group with 3, 4, 5, 6, 7, 8, 9, 10, 11, 12, 13, 14, 15, 16, 17, 18, 19 or 20 carbon atoms. Optionally, an alicyclic group has from 3 to 15, optionally from 3 to 12, optionally from 3 to 10, optionally from 3 to 8 carbon atoms, optionally from 3 to 6 carbons atoms. The term "alicyclic" encompasses cycloalkyl, cycloalkenyl and cycloalkynyl groups. It will be appreciated that the alicyclic group may comprise an alicyclic ring bearing one or more linking or non-linking alkyl substituents, such as —CH2- cyclohexyl. Specifically, examples of the $C_{3-2}$ cycloalkyl group include cyclopropyl, cyclobutyl, cyclopentyl, cyclohexyl, cycloheptyl, adamantyl and cyclooctyl.

An aryl group or aryl ring is a monocyclic or polycyclic ring system having from 5 to 20 carbon atoms, wherein at least one ring in the system is aromatic and wherein each ring in the system contains three to twelve ring members. An aryl group is optionally a "$C_{6-12}$ aryl group" and is an aryl group constituted by 6, 7, 8, 9, 10, 11 or 12 carbon atoms and includes condensed ring groups such as monocyclic ring group, or bicyclic ring group and the like. Specifically, examples of "$C_{6-10}$ aryl group" include phenyl group, biphenyl group, indenyl group, anthracyl group, naphthyl group or azulenyl group and the like. It should be noted that condensed rings such as indan, benzofuran, phthalimide, phenanthridine and tetrahydro naphthalene are also included in the aryl group.

As used herein, unless otherwise expressly specified, all numbers such as those expressing values, ranges, amounts or percentages may be read as if prefaced by the word "about", even if the term does not expressly appear. The term "about" when used herein means+/−10% of the stated value.

Also, any numerical range recited herein is intended to include all sub-ranges subsumed therein. Singular encompasses plural and vice versa.

As used herein, the term "polymer" refers to oligomers and both homopolymers and copolymers, and the prefix "poly" refers to two or more. Including, for example and like terms means including for example but not limited to.

Additionally, although the present invention has been described in terms of "comprising", the processes, materials, and coating compositions detailed herein may also be described as "consisting essentially of" or "consisting of".

When used herein, "average" refers to mean average, unless otherwise provide for.

Where ranges are provided in relation to a genus, each range may also apply additionally and independently to any one or more of the listed species of that genus.

All of the features contained herein may be combined with any of the above aspects in any combination.

For a better understanding of the invention, and to show how aspects of the same may be carried into effect, reference will now be made, by way of example, to the following experimental data and figures.

BRIEF DESCRIPTION OF DRAWINGS

Aspects of the present disclosure will now be described hereinafter, by way of example only, with reference to the accompanying drawings in which.

EXAMPLES

Permeate Carrier Component

Figure 1:
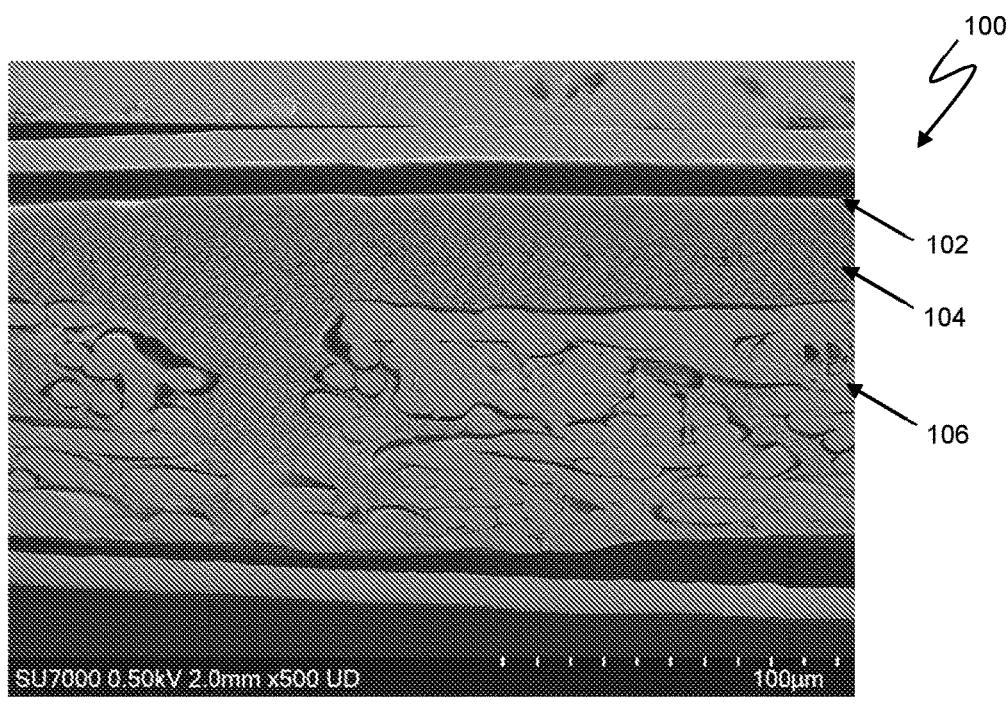
FIG. 1 shows a cross sectional view of a polyamide thin film composite (TFC) reverse osmosis (RO) industrial desalination membrane. The membrane (100) comprises 3 layers: (i) an active layer (102); (ii) a supporting layer (104); and (iii) a backing layer (106).

Comparative Example 1: Referring to FIG. 1, a polyamide TFC RO industrial desalination membrane formed of: a feed spacer having knitted structure and thickness of 863 μm; and membrane envelopes comprising a permeate carrier having knitted irregular non-lattice structure and thickness of 457 μm; and a membrane (100) comprising 3 layers: (i) an active layer (102) made from interfacial polymerisation of polyamide having a thickness of 100 nm; (ii) a supporting layer (104) made from UF PES having thickness of 50 μm; and (iii) a backing layer (106) made from a nonwoven polyester having a thickness of 120 μm. The membrane had packing density of 1000 m²/m³. A seawater feed after pre-treatment with a salt concentration of 20,000 ppm, was directed into the membrane. A flow velocity of 1.2 m/s, at pressure of 55 bar was required to generate a Re number higher than 2300 and obtain a permeate flux of 2 L/(m² hr).

Figure 2:
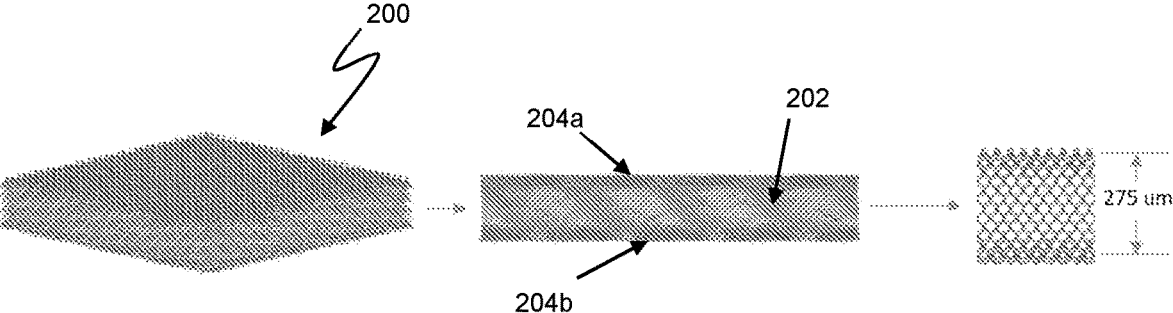
FIG. 2 shows a perspective view of an additive printed component (200) operable as a permeate carrier to allow permeate to flow.

Example 1: Referring to FIG. 2, a polyamide TFC RO industrial desalination membrane formed of: a feed spacer having knitted structure and thickness of 863 μm; and membrane envelopes comprising a permeate carrier component (200) according to the present invention having a non-uniform lattice structure and thickness of 275 μm; and a membrane comprising 3 layers: (i) an active layer made from interfacial polymerisation of polyamide having a thickness of 100 nm; (ii) a supporting layer made from UF PES having thickness of 50 μm; and (iii) a backing layer made from nonwoven polyester having a thickness of 120 μm.

The permeate carrier (200) is formed of a lattice structure that is non-uniform such that the pore size of the unit cell size changes along the Z plane of the lattice structure. The unit cell pore size is largest in the middle (202) of the lattice structure and the unit cell pore size decreases toward the top (204*a*) and bottom (204*b*) faces of the lattice structure.

A seawater feed after pre-treatment with a salt concentration of 20,000 ppm, was directed into the polyamide TFC RO industrial desalination membrane comprising the permeate carrier component (200). The membrane was able to operate at a flow velocity between 0 and 1 m/s to achieve a Re number of 2300. At a seawater feed flow velocity of 1 m/s, a pressure of 45 bar generated a Re number higher than 2300 and obtained a permeate flux rate of 3 L/(m² hr). The structure of the component (200) resulted in an increase in packing density by 15% from the comparative examples, with a packing density of 1000 m²/m³ to 1150 m²/m³.

Backing Layer Component

Comparative Example 2: A spiral wound membrane formed of: a feed spacer having knitted structure and thickness of 863 μm; and membrane envelopes comprising a permeate carrier having knitted irregular non-lattice structure and thickness of 457 μm; and a membrane comprising 3 layers: (i) an active layer made from interfacial polymerisation of polyamide having thickness of 150 nm; (ii) a supporting layer made from UF PES having thickness of 80 μm; and (iii) a backing layer made from nonwoven polyester having thickness of 150 μm. The spiral wound membrane had a packing density of 900 m²/m³. A transmembrane pressure of 7 bar, using a brackish water feed of 2000 ppm MgSO4, was required to achieve a water yield of 30 to 50 L/(m² hr).

Figure 3:
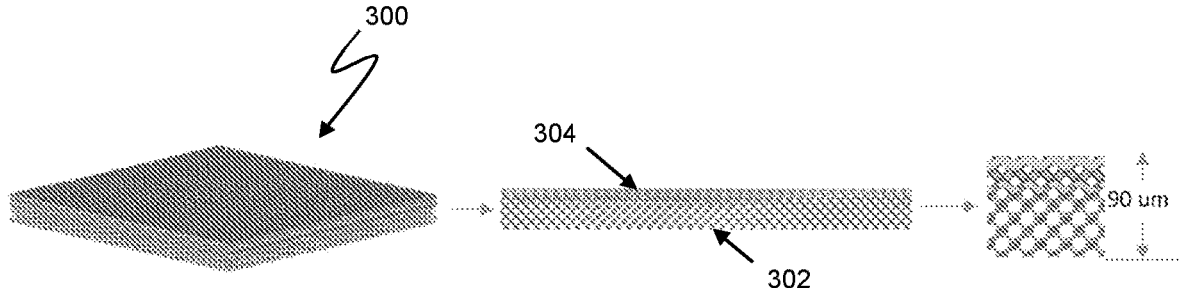
FIG. 3 shows a perspective view of an additive printed component (300) operable as a backing layer to allow permeate to flow.

Example 2: Referring to FIG. 3, a spiral wound membrane formed of: a feed spacer having knitted structure and thickness of 863 μm; and membrane envelopes comprising a permeate carrier having knitted irregular non-lattice structure and thickness of 457 μm, and a membrane comprising 3 layers: (i) an active layer made from interfacial polymerisation of polyamide having thickness of 150 nm; (ii) a supporting layer (104) made from UF PES having thickness of 80 μm; and (iii) a backing layer component according to the present invention (300), having a thickness of 90 μm.

The backing layer (300) is formed of a lattice structure that is non-uniform such that the pore size of the unit cell size changes along the Z plane of the lattice structure. The unit cell pore size is largest from the bottom face to the middle (302) of the lattice structure and the unit cell pore size decreases toward the top face (304) of the lattice structure.

The use of backing layer component (300), resulted in an increase in packing density by 5% from comparative example 2, with a packing density of 1000 m²/m³, to 1050 m²/m³. A transmembrane pressure of 5 bar, using a brackish water feed of 2000 ppm MgSO4, generated a water yield of 30 to 50 L/(m² hr).

Combined Permeate Carrier and Backing Layer Component

Comparative Example 3: An 8-inch industrial spiral wound unit from Toray comprising: a feed spacer having thickness of 660 μm; membrane envelopes comprising a permeate carrier having a thickness of 457 μm and an irregular non-lattice; and a Toray membrane comprising: (i) an active separation layer of crosslinked aromatic polyamide with thickness of 200 nm; (ii) a supporting layer (104) of PES having thickness of 45 μm; and (iii) a backing layer (106) made from nonwoven polyester having thickness of 100 μm and an irregular non-lattice structure. The membrane is spiral wound into the spiral wound unit, together with the traditional knitted feed spacer. The spiral wound unit has a packing density of ~1000 m²/m³.

Figure 4:
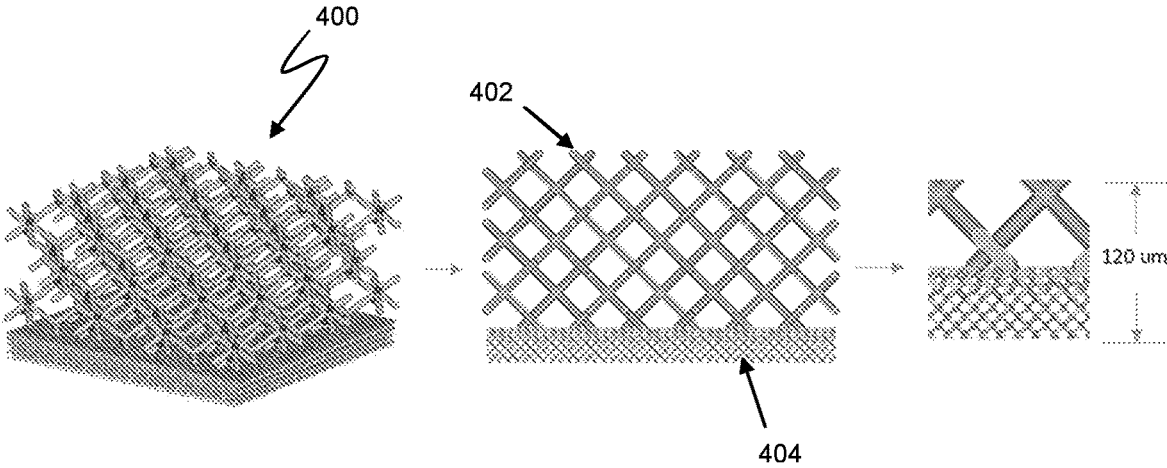
FIG. 4 shows a perspective view of an additive printed component (400) operable as a combined permeate carrier and backing layer to allow permeate to flow.

Example 3: Referring to FIG. 4, there is provided a spiral wound unit comprising: a feed spacer having thickness of 660 μm; and membrane envelopes comprising a membrane comprising: (i) an active layer of crosslinked aromatic polyamide with a thickness of 200 nm; (ii) a supporting layer of PES having thickness of 45 μm; and (iii) a combined permeate carrier and backing layer component having a non-uniform lattice structure according to the present invention (400), with an overall thickness of 120 μm (406). The membrane envelopes were spiral wound into a spiral wound unit, together with the traditional knitted feed spacer.

The combined permeate carrier and backing layer component (400) is formed of a lattice structure that is non-uniform such that the pore size of the unit cell size changes along the Z plane of the lattice structure. The unit cell pore size is largest from the top face to the middle (402) of the lattice structure and the unit cell pore size decreases toward the bottom face (404) of the lattice structure.

The packing density of the spiral wound unit containing the membrane according to the present invention increased by 50% compared to comparative example 3 with a packing density of 1000 m²/m³ to 1500 m²/m³. A transmembrane pressure of 39 bar, when using a seawater feed, was required to obtain a permeate flux of 2 L/(m² hr).

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A component for a spiral membrane, such as for water filtration, comprising an integrally formed non-uniform lattice structure, wherein the lattice structure comprises a first and second repeating unit cell, wherein the first and second unit cells are different; and wherein the lattice structure comprises a higher archival lattice structure.

2. The component for a spiral membrane according to claim 1, wherein the component is a permeate carrier, a backing layer or a combined permeate-backing layer.

3. The component according to claim 1, wherein the pore size of the first and/or second unit cell, when present, of the lattice structure is ≥10 μm and/or is ≤5 mm.

4. The component according to claim 1, wherein the pore size of the first and/or second unit cell, when present, of the lattice structure is ≥40 μm and/or is ≤1 mm.

5. The component according to claim 1, wherein the second repeating unit cell has a different strut thickness compared to the first repeating unit cell.

6. The component according to claim 1, wherein the average strut thickness of the first and/or second unit cell, when present, of the lattice structure is ≥10 μm and/or is ≤5 mm.

7. The component according to claim 1, wherein the average strut thickness of the first and/or second unit cell, when present, of the lattice structure is ≥40 μm and/or is ≤1 mm.

8. The component according to claim 1, wherein a Reynolds number (Re) of at least 2300 is obtainable at a flow rate of between 0 and 1 m/s.

9. The component according to claim 1, wherein the component is operable to function at a transmembrane pressure of 30 bar to 50 bar or 3 bar to 15 bar.

10. The component according to claim 1, wherein the component has a packing density of ≥650 $m^2/m^3$.

11. The component according to claim 1, wherein a unit cell comprises the scalar fields of two or more unit cells mixed to produce a new mixed unit cell.

12. The component according to claim 1, wherein a unit cell is shelled to form an internally hollow structure.

13. A membrane envelope comprising:
   a. a permeate carrier or permeate-backing layer component according to claim 2; and
   b. a filtration membrane layer, wherein the filtration membrane layer comprises an active layer and a support layer, wherein the active layer comprises graphene or a derivative thereof, a transition metal dichalcogenide (TMD) and/or a metal-organic framework.

14. The membrane envelope according to claim 13, wherein a first side of the component is adjacent to the backing layer or support layer of the first filtration membrane layer and a second side of the component is adjacent to the backing layer or support layer of the second filtration membrane layer, wherein the first and second filtration membrane layers may be parts of the same folded membrane or two parts from discrete membranes.

15. The membrane envelope according to claim 13, wherein the permeate-backing layer component comprises ≥40% of the total membrane envelope thickness.

16. A method of preparing a component according to claim 1, the method comprising the steps of:
   a. producing the component by additive manufacturing the lattice structure, wherein the wherein the additive manufacturing method is stereolithography, digital light processing, two-photon polymerisation, two colour photo-polymerisation, inkjet printing, binder jet printing, stereolithography (SLA), direct ink writing, three-dimensional printing, selective laser sintering, selective laser melting, laminated object manufacturing, and/or fused deposition modelling.

* * * * *